United States Patent [19]

Paszner

[11] E Patent Number: Re. 32,329

[45] Reissued Date of Patent: Jan. 13, 1987

[54] METHOD OF ADHERING MINERAL DEPOSIT IN WOOD FRAGMENT SURFACES

[76] Inventor: Laszlo Paszner, 3906 W. 33rd Ave., Vancouver, British Columbia, Canada, V6N 2H8

[21] Appl. No.: 630,388

[22] Filed: Jul. 13, 1984

Related U.S. Patent Documents

Reissue of:

[64] Patent No.: 4,339,405
Issued: Jul. 13, 1982
Appl. No.: 21,775
Filed: Mar. 20, 1979

[51] Int. Cl.[4] ..... B28B 1/00

[52] U.S. Cl. ..... 264/108; 106/105; 106/121; 264/113; 264/115; 264/122; 264/135; 264/309; 427/4; 501/111

[58] Field of Search ..... 264/108, 113, 114, 115, 264/122, 135, 136, 309; 106/18.16, 18.31, 105, 121; 427/4, 205, 333&; 501/111

[56] References Cited

U.S. PATENT DOCUMENTS

| | | | |
|---|---|---|---|
| 1,568,507 | 1/1926 | Jaeger . | |
| 2,175,568 | 10/1939 | Haustein | 106/73 |
| 2,456,138 | 12/1948 | Marini | 132/21 |
| 2,837,435 | 6/1958 | Miller et al. | 106/93 |
| 3,271,492 | 9/1966 | Elmendorf | 264/122 |
| 3,278,320 | 10/1966 | Neely et al. | 106/58 |
| 3,285,758 | 11/1966 | Limes et al. | 106/58 |
| 3,285,759 | 11/1966 | Crespi | 106/58 |
| 3,413,385 | 11/1968 | Komac et al. | 106/58 |
| 3,475,188 | 10/1969 | Woodhouse | 106/58 |
| 3,525,632 | 8/1970 | Enoch | 106/85 |
| 3,821,006 | 6/1974 | Schwartz | 106/85 |
| 3,879,209 | 4/1975 | Limes et al. | 106/58 |
| 3,950,472 | 4/1976 | Cheh Jen Su | 264/122 |
| 3,972,972 | 8/1976 | Yano et al. | 264/122 |
| 4,008,342 | 2/1977 | Richardson | 427/333 |
| 4,102,691 | 7/1978 | Walters et al. | 427/205 |
| 4,115,431 | 12/1963 | Stokes et al. | 264/108 |
| 4,228,202 | 10/1980 | Tjännberg | 106/18.16 |
| 4,339,405 | 7/1982 | Paszner | 264/122 |

*Primary Examiner*—Donald Czaja
*Assistant Examiner*—Mary L. Fertig
*Attorney, Agent, or Firm*—Hughes & Cassidy

[57] ABSTRACT

The disclosed process for making cast vegetable/mineral structural products having flame retardant properties utilize a major volume portion of ligneus plant fragments such as soft and hardwoods, sugarcane, cereal and fiber plant stalks, and a minor volume proportion of a mineral binder deposit comprised of magnesium or calcium oxyphosphates and inert filler particles. Fragments having thickness ranging from 0.3 mm to 8 mm including chips, shavings, strips, strands, fibre bundles, slivers, fibres and peeled and sawn veneer sheets, have applied to their surfaces an aqueous solution of ammonium polyphosphate or soluble acid phosphate salt supplying from 0.15 to 0.40 parts of $P_2O_5$ as phosphate ion per part of fragments by weight, and particulate cement solids comprised of MgO or CaO or $Mg(OH)_2$ or $Ca(OH)_2$ or $MgCO_3$ or $CaCO_3$ ranging from 0.25 to 1.0 part per part of fragment, and from 0.01 to 0.80 parts of inert filler particles and the mixture is molded and held under predetermined compaction pressure until the product has rigidified, in about 10 minutes' times. *The molded mass is held under compaction with unit pressures in the range from about 0.3 to about 14 kg/cm²*. The process is practically immune to cement poisoning sugars and polyphenolics which were found to be detrimental to other cement mixes.

61 Claims, 5 Drawing Figures

METHOD OF ADHERING MINERAL DEPOSIT IN WOOD FRAGMENT SURFACES

Matter enclosed in heavy brackets [ ] appears in the original patent but forms no part of this reissue specification; matter printed in italics indicates the additions made by reissue.

This invention concerns an improved process for bonding or combining lignocellulosic fragments with mineral inorganic binder materials and forming the admixture into a structural product.

The invention particularly relates to such processes wherein the binder materials comprise selected alkaline earth metal compounds and solutions of salts of phosphoric acid reactive therewith capable of developing a bond mass which is distributed initially on fragment surfaces as a gel coating that sets rapidly to a rigid stone-like solid strongly bonding the fragments to each other.

*Fragments having thicknesses ranging from 0.3 mm to 8 mm including chips, shavings, strips, strands, fibre bundles, slivers, fibers and peeled and sawn veneer sheets, have applied to their surfaces an aqueous solution of ammonium polyphosphate or soluble acid phosphate salt supplying from 0.15 to 0.40 parts of $P_2O_5$ as phosphate ion per part of fragments by weight, and particulate cement solids comprised of MgO or CaO or $Mg(OH)_2$ or $Ca(OH)_2$ or $MgCO_3$ or $CaCO_3$ ranging from 0.25 to 1.0 part per part of fragment, and from 0.01 to 0.80 parts of inert filler particles and the mixture is molded and held under predetermined compaction pressure until the product has rigidified, in about ten minutes time. The molded mass is held under compaction with unit pressures in the range from about 0.3 to about 14 kg/cm².*

The present invention is based on the discovery that when a major volume proportion of lignocellulosic fragments are admixed with aqueous solutions of phosphoric acids or solutions of nearly neutral phosphate salts, particularly aqueous solutions of ammonium salts of polyphosphoric acid in amount to partially impregnate the fragments, and the admixture is then dusted with a minor volume proportion of magnesium or calcium oxides, hydroxides, or carbonates, a bond mass is developed at the fragment surfaces which sets rapidly from a gel phase to a strongly adhered rigid concrete integral with the fragments regardless of the presence of sugars, phenolics water or extractables in the fragments.

Products molded by the processes according to the invention may comprise any of the common structural shapes such as boards, panels, slabs, beams and blocks, and may comprise frames, trusses, poles, tubes, and virtually any castable configurations. Such products may be made economically with little or even no mixing in a wide range of product bulk densities according to the degree of compaction maintained during setting, and require very short molding and curing times. Such products after curing are flame resistant, rot resistant, weather resistant, and are not attacked by termites.

BACKGROUND OF THE INVENTION

Heretofore much effort has been made to realize lightweight and low-cost concreted products utilizing as filler material lignocellulosic fragments, and employing as bonding agent some form of mineral cement, to produce building materials. Typical cements have comprised Portland and other hydraulic cements and pozzolans, and magnesia cements such as Sorel cement. The problems of forming products of adequate strength and with densities less than unity arise because of inferior junction bond strength, that is, the adherence of the mineral mass to the woody filler. An understanding of the composition of wood fragments, and the chemistry of the reactants producing the mineral bond mass, may be gained by considering the following discussion.

Woody plant structures comprise arrays of hollow cells (tracheids) having fiber constituents comprised as cellulose which is present as high-polymer strong micro-fibril wall structure surrounded by non-fiber carbohydrate, constituents which encompass the lignins, sugars, starches, extractives, proteins polyphenolics, resins, waxes, fatty substances, and gums. Various sequestered minerals may also be occluded, chiefly silica. When woody plant materials are comminuted to product fragments by mechanical processes a wide range of fragment shapes, [porosites] *porosities*, pore opening area, sizes and ratios of surface area to volume can be produced; for example, the fragments may be crumb-like saw-generated particles and dusts; rough lumps, slivers and dusts made by hammer milling or hogging; pulp fibers made by wet grinding; and shavings, veneers, strands, wood-wools and excelsiors made by slicing with knife-edge tools.

The prior art has shown amply that although fragments of a range of sizes may be admixed with a minor volume proportion of cementitious binder material such as a hydraulic cement or magnesium oxychloride cement, the cast product may be useless due to poor bonding between the gelling bond mass and the fragment surfaces, or due to poor setting or even total absence of setting of the [bonder remants] *binder reactants*. For example, any attempt to make a lightweight concreted product using Western Red Cedar (Thuja Plicata) fragments made from bark-free boles, combined with Portland cement, results in a non-setting mixture which never hardens or forms a bond. The failure to achieve set has been ascribed to the detrimental effects on the cement hydration process of certain extractives, chiefly wood sugars and polyphenolics. Poor sets with hydraulic cements also result from combinations of many other wood species, notably most tropical woods, and at the present time cement-bonded compositions are restricted to a few species such as the spruces (Picea Stitchensis), true firs (Abies Sp.), aspens (Populus Sp.) and some pines (Pinus palustris, Pinus Lambertiana). However, even preferred species which have lesser amounts of adversely-reacting extractables require precleaning and migration-blocking treatments to either remove inhibiting substances, or to seal fragment surfaces, or to convert near-surface contaminants to innocuous residues. The contaminating substances present in untreated fragments become partly dissolved as water from the cement slurry migrates through the fragment openings, and the extracted material has ample time to become distributed in the slurry to impede or prevent gelling; it may also be conjectured that the fragment surfaces become coated with extracted material, impairing the adherence of the bond mass.

Typical treatments hitherto resorted to comprise: (a) impregnating fragment surfaces with soluble metal salts such as chlorides of calcium or magnesium, which hasten the set of hydraulic cement slurry adjacent the fragment; (b) digesting extractables at and near fragment surfaces by treatment with baths of lime or caustic soda, with or without further stabilizing by a pozzolan or a polyvalent metal salt; and (c) loading surfaces of fragments with a mineral gel, e.g. sodium silicate. Despite such costly pre-treatment procedures, which necessitate at least an additional drying step, the adhesion of the mineral bond mass is relatively poor, as compared for example with that of thermosetting resinous adhesives currently employed for bonding wood fragments as boards. The inferior adhesion of such prior junction bond masses to wood fragments is thought to arise from the failure to develop a gel phase of reacting binder materials extending within pores and lumen openings presented at fragment surfaces, with consequent non-integral deposit of mineral bond mass following hardening. Such bonding as is observed is speculated to be mainly the result of embedment of fragment portions by a partial matrix of the bond mass. Examples of prior art lignocellulose/mineral composite products are described in United Kingdom specification No. 1,089,777 of Nov. 8, 1967, and in U.S. Pat. Nos. 2,175,568 of Oct. 10, 1939 to Haustein, 2,837,435 of June 3, 1958 to Miller et al, and 1,568,507 of Jan. 5, 1926 to Jaeger. Nailing concretes are described in United States Department of the Interior, Bureau of Reclamation text "Concrete Manual", Sept. 1949, pp. 351-352.

The prior art has proposed dry cement compositions comprising phosphorous containing compounds including phosphoric acid, and basic metal oxides such as aluminum and magnesium oxides and their oxyphosphate compounds, settable on mixing with water to form a concrete binder, as dislosed in U.S. Pat. No. 3,525,632 dated Aug. 25, 1970 issued to Enoch, C. R. Such cements are intended to be used with mineral aggregates.

A number of prior workers have combined water-soluble or dissolved acid phosphates with magnesia in rapid-setting compositions incorporating refractory fillers. In U.S. Pat. No. 2,456,138 issued to Wainer, dated Apr. 5, 1949, a mold of this type uses ammonium di-acid phosphate and dead-burned magnesia as cementing constituents which set rapidly to a refractory solid. Gunning mixes for repairs to linings of metal-melting furnaces have proposed alkaline polyphosphates, iron oxide, with magnesia or chromite non-acid constituents, in U.S. Pat. No. 3,278,320 dated Oct. 11, 1966, issued to Neely et al. Suggested polyphosphates named include sodium and ammonium polyphosphates.

Another wet-chemistry composition intended for a casting or pressing mix in repairing furnace linings has been proposed by Limes et al in U.S. Pat. No. 3,285,758 issued Nov. 15, 1966 using ammonium polyphosphates in water solutions of analysis 10% ammoniacal nitrogen and 34% $P_2O_5$, further diluted and mixed with a minor weight proportion of magnesia or calcined magnesite and a major proportion of refractory aggregates.

A similar composition intended for very rapid chemical reaction and gunning application to hot oven walls, disclosed in U.S. Pat. No. 3,413,385 issued Nov. 26, 1968 to Komac et al, utilizes mixed ammonium phosphates combined in the gun with a minor weight proportion of magnesia dispersed in a dry aggregate.

It has been proposed in U.S. Pat. No. 3,821,006 issued June 28, 1974 to Schwartz to make a castable concrete by admixing water to dry constituents comprising dead-burned magnesia, an acid phosphate salt such as ammonium orthophosphate, and a finely-divided inert aggregate, utilizing heat of the exothermic reaction yielding magnesium phosphate binder to set the concrete within minutes and develop a cure within a day.

A fast-setting concrete of low porosity disclosed in U.S. Pat. No. 3,879,209 issued Apr. 22, 1975 to Limes et al, is made with 15 parts by weight of 34 percent $P_2O_5$ ammonium polyphosphate solution and an equal weight of −150 mesh magnesia, admixed with 70 parts limestone, dolomite, sand, or gravel, 3 parts salt, and 15 parts water; such concrete develops an early set and high compressive strength in a few hours.

The formulation of a substantially dry mix wherein one constituent is an acid that is normally liquid such as hydrochloric or phosphoric, or ammonium polyphosphate solution, and another constituent is alumina, dead-burned magnesia or chromite, is proposed in U.S. Pat. No. 3,475,188 dated Oct. 28, 1969 issued to Woodhouse et al, wherein the liquid chemical is adsorbed in a chemically inert pulverulent mineral solid such as bentonite or kieselguhr. Upon adding water to the dry mix the bond-forming liquid is flushed from the absorbent mineral to react with the base constituents to form a refractory solid.

While the formulations hitherto proposed are efficaceous in binding granular mineral aggregates such as refractories to form high-density products, the substitution of wood fragments in the mixes has failed to produce high-strength, low density structural products. Only when a major volume proportion of mineral cementing materials is present, yielding product densities well above 1.5 characterized by nearly complete occlusion of any fragment in a mineral matrix, can products of significant compressive strength be realised. However, the composite product proves weak in shear and tension, due to inferior bond adhesion.

The binding together of mineral solids by a cementing agent essentially requires that such agent be a viscous liquid, paste, or slurry, capable of wetting all surfaces of the mineral solids while plastic, and capable of gelation and development of interlocked crystal groups adhered to at least some portions of the aggregate materials. Cast bodies have high compressive strengths due to the effective support column created by the cement matrix surrounding the aggregate grains, but low tensile strength due to relatively low shear strengths of the bonds.

The problem of producing a truly strong lignocellulose/mineral composite product has not heretofore been met. As an objective, the production of low weight structural products with bulk density under 0.8, and preferably under 0.65, with Modulus of Rupture in static bending above 10 kg/cm$^2$ and preferably above 100 kg/cm$^2$, is highly desirable in order to provide cheap building materials utilizing forest and crop residues. Generally, the proportional limit of fiber stress for average woods in tension is above 350 kg/cm$^2$ in air-dry condition; the weakest strength is in shear parallel to the grain, usually above 35 kg/cm$^2$. It can therefore readily be appreciated that provided a sufficiently strong junction bond can be developed between assembled wood fragments, structural products potentially having excellent Modulus of Rupture strength properties would be feasible. The following discussion elucidates the problem of achieving such structures.

DISCUSSION OF STRESSES IN MOLDED COMPOSITE MINERAL-BONDED LIGNOCELLULOSIC FRAGMENT ASSEMBLIES

When wood fragments in a range of sizes are packed together with a binder material in such volume proportions that the binder volume is a fraction of the actual wood volume, and the binder coats the fragment surfaces to form linking and bridging domains between adjacent fragments pressed together under molding pressure, the product inherently includes voids. If very great compaction pressures are applied, the void volume may be less than 10%; however when assemblies having densities of 0.5 to 0.9 are desired the ratio of internal spaces to total molded volume may range from 30 to 75% or more. It will be evident that the stress-resisting structure is weakened by the presence of such voids as compared to a specimen of whole, clear wood.

The ability of the composite molded assembly to resist an applied load, as in pure tension, or as a column in compression, or a torque, or as a beam supported at its ends subjected to a load intermediate the ends, will depend on the ability of the fragments as laid up and on the junction bond cross-section and strength to withstand the localized stresses. The directions of principal tensile and compressive stresses do not follow smooth curves, as in an ideal homogeneous beam, because of the presence of voids. Consequently, in light-weight molded structural products the bond adhesion to fragment surfaces, and the actual strength of the binder itself, are the critical parameters which determine the capacity of the molded product to resist loads.

In panels, sheet, post, beam and slab product forms which the invention primarily is intended to make, an analysis of the stress-resisting structure undergoing lateral bending as a beam will show the magnitude of principal tensile stress to be maximum at mid-span and parallel with the span length, the magnitude decreasing and the direction of stress sloping increasingly upward until it reaches about 45° at the supports. Because the span length is a large multiple of the beam depth in panels and boards, and since the constituent fragments will usually have thickness dimensions a small fraction of the beam depth, a large number of linked fragments are involved in a three-dimensional chain or lattice resisting the tensile stress, the fragments and their associated bond bridges located along the lower mid-span surface carrying the largest bond loads. A similar chain or lattice adjacent the upper beam surface at mid-span opposes the largest compressive stresses. When a facing sheet of veneer or paper is adhered such member obviously shields the outer chains from part of the stress.

In any randomly compacted group of fragments which are coated with a volume of binder less than the amount that would fill all inter-fragment spaces, the actual cross-sectional area of the junctions which are included in any stress-resisting chain will be less than the fragment cross-sectional areas. It will also be obvious that the bond bridges will have different directions, i.e. the fragment contact planes will usually not be parallel with the direction of the principal tensile stress, hence the bridges will be subjected to varying proportions of shearing and tensile stresses. Because a chain is no stronger than its weakest link it may be seen that those bond bridges subjected solely or mainly to tension represent concentrated stress regions limiting the flexural strength of the product.

For the majority of fragments derived from stalks, stems, boles and branches of woody plants and trees by breaking or cutting operations, the exterior surface of each fragment will be irregular and will comprise partly crushed, deformed, and fissured fiber groups, presenting a relatively large area of openings extending into the woody fragment as compared to the minimum enclosing surface for the fragment volume. Such individual fragments therefore represent lignocellulosic fiber structure which is significantly less strong than the volumes of wood in the plant or tree before the fragment was removed. It becomes highly desirable, therefore, that the setting of the binder mass around and upon the fragment should enhance the flexural and compressive strengths as well as the flexural and compressive moduli of elasticity.

More specifically, the nature of the desired junction bond should be such as to lock the domain of binder between and surrounding fragments integrally to the greatest possible surface area of the fragments; this implies a substantial penetration by binder material into all fissures, apertures and pores opening to fragment surfaces, and no degradation of the strength of binder material by extractables present in the plant materials.

STATEMENT OF THE INVENTION

The present invention contemplates a process for making an adhered mineral cladding layer on a surface area of a ligneus body by applying to the surface an amount of ammonium polyphosphate aqueous solution sufficient to initially wet the surface and a deposit of particulate mineral solids such as magnesium or calcium oxide, or magnesium or calcium hydroxide or magnesium or calcium carbonate in an amount to form a clinging layer adhered to the wet surface, and drying the body. *The drying step is carried out by circulating air at low relative humidity about the product at a temperature of between about 10° C. and about 50° C., and recovering the ammonia gas which is released as a by-product of the reaction of the ammonium phosphate and magnesia from the air.*

The invention in a principal aspect envisages the use of ligneus material which has a moisture content in the range between essentially dehydrated state and about 100% by weight of water, and also envisages use of particulate mineral solids in an amount of between about 15 mg and 200 mg of MgO per $cm^2$ of the ligneus surface of grain sizes ranging between 149 microns and about 15 microns, with an amount of solution supplying from 12 to 20 mg of $P_2O_5$ per $cm^2$ of surface. *The fragments have a moisture content between about 0.5% and 100% by weight prior to the application of the mineral binder. The ammonium polyphosphate solution comprises mixed ammonium phosphates including about 35% up to 40% of ammonium orthophosphate, about 45% to 50% of ammonium pyrophosphate, about 9% to 11% of ammonium tripolyphosphate, and about 2% to 5% higher ammonium polyphosphates, a solution having an ammonium content equivalent to a nitrogen analysis of 10% to 11% and having a phosphate iron content equivalent to a $P_2O_5$ analysis of about 34% to 37% by weight. The solution comprises mixed ammonium phosphates produced by reacting concentrated ammonium hydroxiode solution with polyphosphoric acid having a $P_2O_5$ content of about 83 to produce an aqueous solution providing about 28% to 37% of $P_2O_5$ by weight.*

In yet another aspect the invention may be understood to provide a ligneus body having in its pore spaces a deposit of ammonium phosphate salt and having a surface volume of metal oxyphosphate compounds of a metal which may be magnesium or calcium crystallised in micro-cavities and recesses in the surface volume, the body having an adhered mineral deposit of particulate solids bonded together and to the body by said compounds. *There is applied to the surfaces and pour spaces of*

*a mass of ligneous fragments, an aqueous solution of ammonium phosphate or polyphosphate in an amount of from about 0.85 to about 1.8 parts by weight per part of the fragments calculated on their dried weight as a wetting film supplying from about 0.22 to about 0.70 parts of* $P_2O_5$.

A still further aspect of the invention shows that the invention as recited may provide the body with a salt deposit of 40 mg to 70 mg per cubic centimeter of wood volume and an adhered mineral deposit ranging from about 65 to 400 mg per square centimeter of body surface area.

It will also be obvious that when the fragments are parallel-sided strips such as veneers, shavings, and oriented slivers, laid up as stacks with the longest fragment dimension parallel with the span length, the role of the binder is mainly to resist shearing stresses, which increase generally toward the span ends. As in conventional multi-ply board products assembled from veneer sheets, the adhesion of the binder should be such that a significant shear failure of wood should result when the product is tested to rupture rather than shear failure of the bond.

The present invention is directed to improved bond formation between a wide range of lignocellulosic materials available in nature and mineral binder masses cementing fragments of such materials together as porous compositions.

The invention is directed especially to providing concreted lignocellulose fragment assemblies which have exceptionally high strength properties, as represented by the Modulus of Rupture in bending, while at the same time having light weight and low cost.

The invention is also directed to novel methods of admixing a basic metal compound such as magnesium or calcium oxides, hydroxides and carbonates with a phosphate compound so as to anchor a metal oxyphosphate-cemented bond mass intimately to lignocellulose fragment surfaces, resulting in high bond shear strength.

It is also a purpose of the invention to provide an economical method of mixing and casting a composition having a major volume proportion of lignocellulose fragments and a minor volume proportion of a magnesium [of] *or* calcium oxyphosphate binder mass cementing the fragments together, the composition having a high degree of flame retardation.

Other purposes and advantages of the invention will be made apparent and the practice thereof exposed in and by the following description of its preferred embodiments.

From another aspect the invention is to be understood as providing for the application of the mineral solids as an initial layer of magnesium or calcium oxide, hydroxide or carbonate followed by a second deposit of larger grain sizes and weight per unit area, the initial solids being of particle sizes ranging from sub-micronic to a few microns and in amount of from about 1.5 mg to about 3.5 mg per $cm^2$ of body surface.

The invention can be further comprehended as providing a process for attaching a metal oxyphosphate mineral binder mass as an integral cladding on the surfaces of ligneus fragments bonding to the fragment surfaces a mineral solids layer, and for imparting strength enhancement, fire-retardancy and decay-resistant properties to the fragments by an impregnation treatment of constituent surfaces with an aqueous solution of ammonium polyphosphate and a deposition of the mineral solids layer comprised of a magnesium or calcium compound reactive with the solution to form metal oxyphosphate binder compounds, the solids being of grain sizes in a range from sub-micronic to about 250 microns.

The invention also contemplates processes for attainment of low density structural composites of board form having a core portion of wood fragments incorporating surface impregnating amounts of an electrolyte supplying phosphate ions and carrying an adherent binder mass formed by the reaction of calcium or magnesium oxide, hydroxide or carbonate grains applied as a surface deposit with the electrolyte, the binder mass bridging fragment portions as junction bonding masses, the core portion being bonded to veneer sheets of wood by the binder mass.

It is yet another provision of the invention as recited that sheet-like lignocellulose fragments are utilised having contacting surfaces impregnated with an adhered integral mineral binder mass comprised of the reaction products with ammonium polyphosphate solution and calcium or magnesium oxides, hydroxides or carbonates.

The manner in which the invention may be put into effect, and a description of its preferred embodiments as directed to the production of a wide range of molded composite products such as slabs, panels, boards, beams, columns, posts [ahd] *and* hollow tubes, may be more particularly understood from the description and examples which follow, to be read in conjunction with the several figures of the drawing accompanying, in which.

Figure 4:
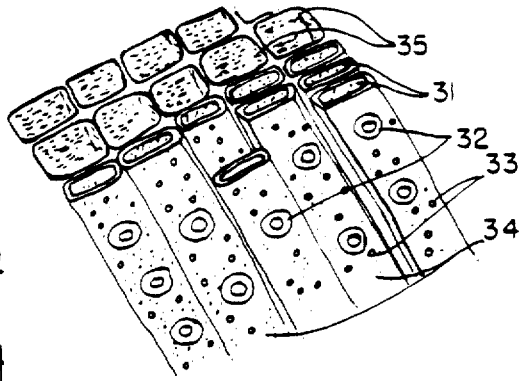
Figure 5:
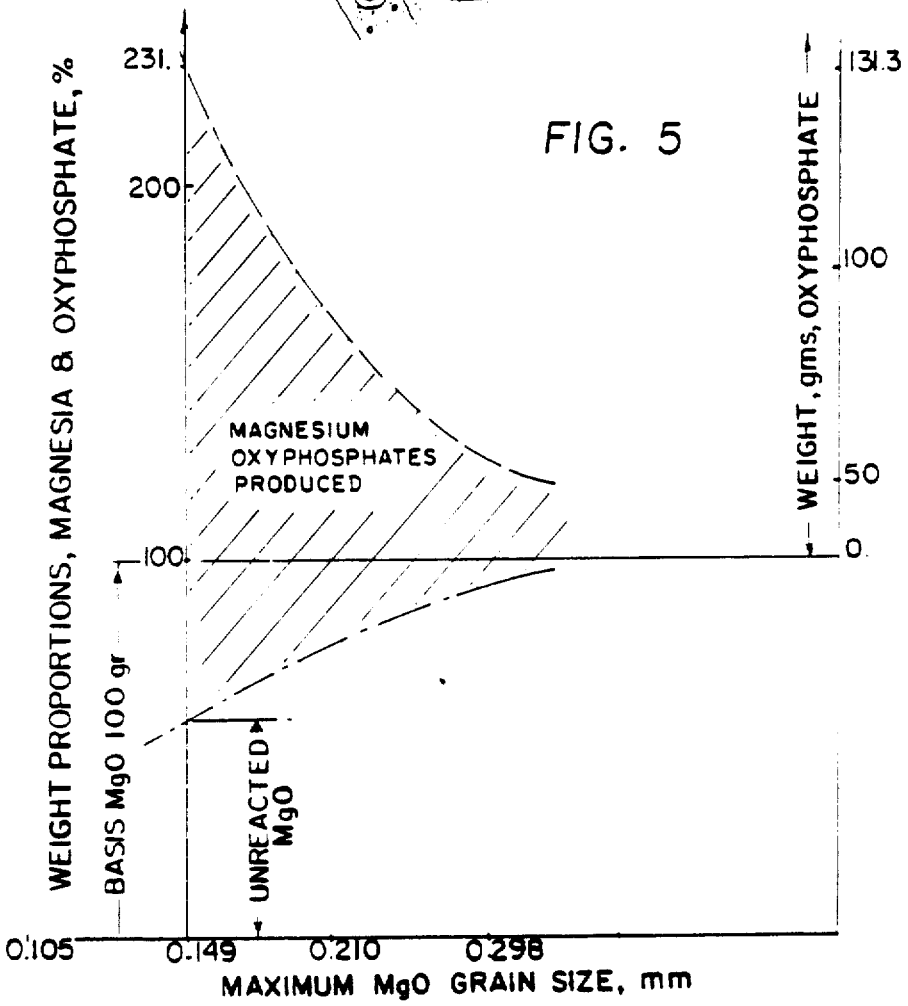

FIG. 5 is a graph diagram relating the proportion of active MgO grains of specific grain size groups and the weight of binder compounds produced by reaction of the active portion with ammonium polyphosphate; and FIG. 4 is a greatly-enlarged perspective view of a surface portion of a softwood constituent carrying an adhered deposit of mineral solids bonded to the wood and to grains of MgO reacted to form the binding compounds and phosphate deposit.

In the description which follows the examples given are intended to instruct and guide in the application of the invention to certain practical embodiments, which are illustrative and in no way to be construed as limiting of the scope and utility of the invention.

PENETRATION OF LIGNOCELLULOSIC PLANT STRUCTURE BY FLUIDS

Figure 1:
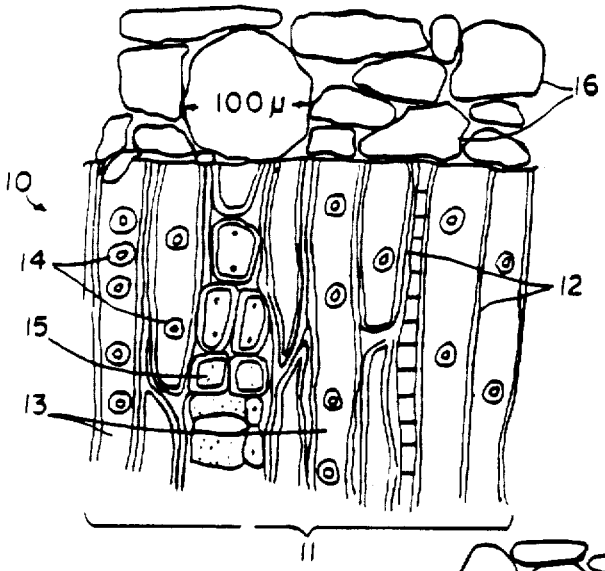
FIG. 1 is a greatly enlarged sectional view on a [tengential] *tangential* splicing plane of fragmental portion of a softwood (Pinus-Strobus L.) showing tracheids and cell structure.
Figure 2:
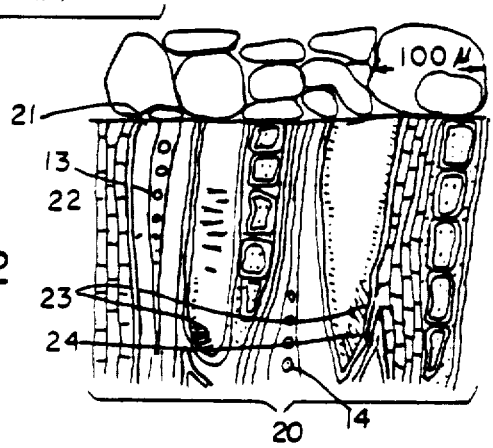
FIG. 2 is a greatly enlarged sectional view on a tangential slicing plane of a fragmental portion of a hardwood (Populus tremuloides) also showing wood cell and vessel structure.

Micro-structures of ligneus fragments cut from softwood and hardwood species are shown in sectional views, FIG. 1 and FIG. 2, taken on tangential-axial slicing planes. As illustrative of the softwoods such as spruce, pine, fir, hemlock and larch, FIG. 1 diagrams a section in greatly enlarged scale of a fragment of eastern pine (Pinus strobus L.) 10 having one sheared surface 11 lying in a diametral cutting plane, and, as viewed in section in radial projection, exposing arrays of conical cells 12 arranged as sectors of growth rings. Other cell arrays may be understood to lie at radially varying distances of the tree bole.

The longitudinal tracheids 12 have lengths up to about 3 mm and are of hollow tubular form, the lumens 13 which are revealed by the cutting and sectioning ranging from about 5 microns to 10 microns in transverse dimension according to the season when they were generated. The tracheid outer transverse dimensions are about 25 to 30 microns. A plurality of very much smaller lateral openings 14, called 'pits', appear in the side walls of the cells. Summer cells have relatively larger lumens and radially thinner walls, whereas fall cells have lumens which are nearly closed by cell wall thickening.

The rupture strength of the cellular arrays in tension is greatest along the columnar direction, with a lesser strength in the radial direction, and least strength along the tangential direction. The relative dimensions of radially-extending wood ray cells 15 and of tracheids 12 may be estimated by reference to a surface deposit of mineral grains 16 of grain sizes up to 100 microns maximum.

In FIG. 2 a similarly-cut fragment 20 of poplar wood (Populus tremuloides) representative of the class of hardwoods such as birch, maple, basswood, blue gum, elm, or ash, has opening to its upper surface 21 not only the reduced dimension lumens 13, but also spaced tubular vessels 22 formed by coalescing of a group of adjacent cells. The vessels may measure up to 50 microns across, and are interrupted along their lengths at intervals by plate members 23 formed with small apertures 24, which allow fluids transported along the vessels to move through the discs.

In both types of wood, numbers of very small pits 14 open through the side walls of the cells, measuring about 2 to 5 microns, and comprising only a very small part of the total wall area of any cell. The pits communicate between the lumens of adjacent cells, affording means for lateral migration of gases or fluids in radial and tangential directions of the wood.

The relative dimensions of hardwood cellular and vessel structures may be understood by comparing the sizes of grains forming a surface mineral deposit of which the largest grains are of 100 micron size.

Referring to FIGS. 1 and 2 the nature of the wood surfaces which are exposed to applied liquid and solid binder-forming materials may be understood, and migration and penetration by liquids into or out of the wood, as well as transport of colloid products into wood spaces will be made apparent.

Considering the areas viewed in each fragment, which represent a wood surface as may be formed by tangentially slicing a growth ring, a fluid such as water or an electrolyte solution or a colloidal suspension may readily gain entry in axial, radial or tangential directions of the wood into the sliced or shattered surface cells. These materials may move beyond the surface layer, through interconnected cells, passing through the pits and discs to penetrate into adjacent cells. While the total cross-sectional area provided by the pit openings and disc apertures is small, the extent of radial migration may be considerable for gases and liquids of low viscosity. Colloid particles can pass through the pits and apertures provided that the viscosity of the suspension and the sizes of agglomerations of particles do not exceed about 2 microns. Solutions of salts, including ammonium polyphosphates, can readily penetrate the fragments from any surface for distances measured in millimeters or even centimeters in a few minutes' time, the movement being more rapid when assisted by a pressure gradient.

Those tracheid walls which have been ruptured present surface recesses of dimensions 5 microns or larger in width and up to 3 mm in height into which both viscous colloids and very small grains of solids may enter. Some hardwood vessels are large enough to engulf solid grains smaller than about 40 microns.

The detailed microstructure of cells may be understood by reference to any text on wood technology detailing the organization of the layers of materials forming the cell walls, namely lignins, hemicelluloses and microfibrils of crystalline and paracrystalline cellulose, all of which have thickness dimensions which are small fractions of one micron. Even when tracheid walls have not been punctured or sheared, water and electrolytes may in time penetrate cell walls after gaining entry to the lumens and eventually occupy the minute spaces between microfibrils. This will be apparent on considering that lignocellulose planks of 5 cm thickness may be impregnated by surface application of ammonium polyphosphate aqueous solution through capillary migration, the wood absorbing 70 milligrams of the dry salt per cubic centimeter of wood which enters as 140 milligrams of a solution of 50% solids by weight, of specific gravity 1.4.

Examinations of micro-sections of dried wood fragments which had been impregnated by ammonium polyphosphate solution of viscosity ranging from about 30 to 90 centipoise at room temperature, revealed a microcrystalline salt deposit extending into wood spaces to a depth of from a few hundred microns to several millimeters as partial or total filling of pits, discs, and lumens, and formed coatings on vessel walls. Such deposit contributes not only significant increases in compressive and bending strengths of the woody material, as will be discussed in detail at a later point, but confers fire-retarding properties to the wood.

Even greater absorption by wood of a surface application of a moderately viscous solution is observed when fragment surfaces are [fissued] *fissured* due to the forces exerted by a forming tool causing partial fiber separation in portions of the wood. Plant fragments such as stalks, canes, straws and stems may be crushed, split or bent, present additional surface area penetrable by liquids and fine solids, and the rate of entry into the fragment is higher as liquid which forms a capillary filling in fissures wets a total surface greater than the enveloping surface of the fragment.

CHEMICAL AND PHYSICAL ASPECTS OF OXYPHOSPHATES

Electric furnace reduction of apatite produces superphosphoric acid characterized in that two or more atoms of phosphorous are present in chain configuration, whereas wet process production of phosphoric acid leads to a single atom of phosphorous in the acid [radicle] *radical*, characterizing orthophosphoric acid. Acid preheat is required when producing polyphosphates, the extent of which depends on the conversion level desired and acid purity of at least 60% of $P_2O_5$.

Ammonium polyphosphate is made by reacting concentrated phosphoric acid and ammonia under controlled conditions. The salts of the respective acids differ in chemical activity and in their degree of polymerization. The polyphosphates are characterized by the repeating orthophosphate group diagrammed below wherein n must be 2 or a higher integer. When n = 1 the group represents orthophosphoric acid:

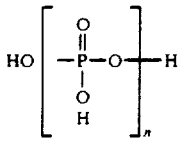

Upon conversion of superphosphoric acid by any reaction producing a salt solution, a degree of depolymerization of the acid occurs, as when electric furnace acid is combined with 37% ammonium hydroxide solution in water to make ammonium polyphosphate of analysis 10-34-0.

The ammonium polyphosphate derived may consist of 65% to 85% of $P_2O_5$ combined as polyphosphates, and 25% to 30% as orthophosphates, or by a different ammoniation a salt product having a $P_2O_5$ content about equally divided between ortho- and polyphosphate salts may be made. These products are highly reactive with the basic alkaline earth metal oxides, hydroxides and carbonates, especially those of magnesium and calcium, and the reaction products formed are classifiable as metal oxyphosphates.

Structural diagrams illustrative of the formation of oxyphosphate reaction products of aqueous solutions of ammonium orthophosphate and ammonium pyrophosphate, respectively, with magnesium oxide, are diagrammed below:

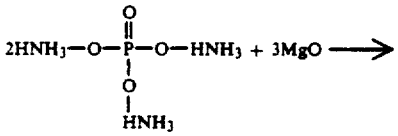

ammonium orthophosphate
$(NH_4)_3.(PO_4)_2$

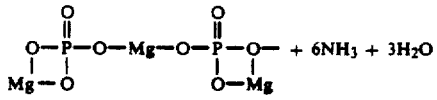

magnesium orthophosphate
$(MgO)_3.P_2O_5.4H_2O$

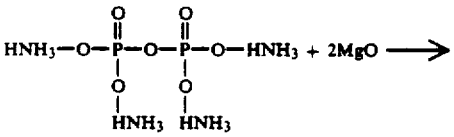

ammonium pyrophosphate
$(NH_4)_4P_2O_7$

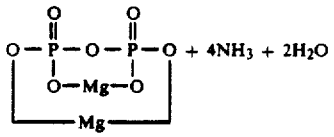

magnesium pyrophosphate
$(MgO)_2.P_2O_5.3H_2O$

The corresponding reaction between a calcium or magnesium hydroxide leads to the formation of the same amounts of ammonia with additional molecules of water.

The reaction of magnesium carbonate leads to the formation of ammonium carbonate dissolved in the aqueous medium, as may be understood from the equation for the reaction between ammonium pyrophosphate and magnesium carbonate:

$$(NH_4)_4P_2O_7 + 2MgCO_3 \rightarrow (MgO)_2P_2O_5.3H_2O + 2(NH_4)_2CO_3$$

Higher ammonium polyphosphates (e.g. tri-, tetra-, etc.) yield corresponding higher magnesium oxyphosphate compounds as may be understood from the examples of combining proportions of MgO and $P_2O_5$ listed hereinbelow:

| | |
|---|---|
| magnesium orthophosphate | 1 MgO to 0.333 $P_2O_5$ |
| magnesium pyrophosphate | 1 MgO to 0.500 $P_2O_5$ |
| magnesium tripolyphosphate | 1 MgO to 0.600 $P_2O_5$ |
| magnesium tetrapolyphosphate | 1 MgO to 0.666 $P_2O_5$ |
| magnesium pentapolyphosphate | 1 MgO to 0.7142 $P_2O_5$ |
| magnesium hexapolyphosphate | 1 MgO to 0.750 $P_2O_5$ |

The relative weight proportions of the $P_2O_5$ contents of the orthophosphate and polyphosphate compounds typical of commercial ammonium polyphosphate solution of analysis 10% nitrogen as ammonia and 34% $P_2O_5$ phosphate ion, having a specific gravity of 1.4 and a solids content of 50% by weight, are indicated by the following listing, based on 100 gm of solution:

| | |
|---|---|
| orthophosphate | 6.3 to 7.2 parts |
| pyrophosphate | 9.2 to 10.1 parts |
| tripolyphosphate | 0.55 to 0.61 parts |
| tetra and higher polyphosphates | about 0.2 parts |

The pyrophosphates of magnesium and calcium are especially water resistant and strong and are deemed slightly superior to orthophosphate compounds of these metals.

In the highly exothermic reaction of ammonium polyphosphates with the basic oxides and hydroxides water is produced in mol-formol amount and ammonia is liberated in 2:1 mol ratio with respect to the basic metal compounds MgO, CaO, $Mg(OH)_2$ and $Ca(OH)_2$. The relatively large volume of ammonia gas, although highly soluble initially in the aqueous reacting medium, is eventually expelled as the temperature rises. A peak temperature of from 50° C. to 65° C. is attained when even small amounts of magnesium oxide, for example, are reacted with an excess of ammonium polyphosphate solution within 10 to 20 minutes of mixing. A typical plot of attained temperature with time for a plug measuring 2.7 cm diameter by 4.0 cm length is shown in FIG. 3.

Figure 3:
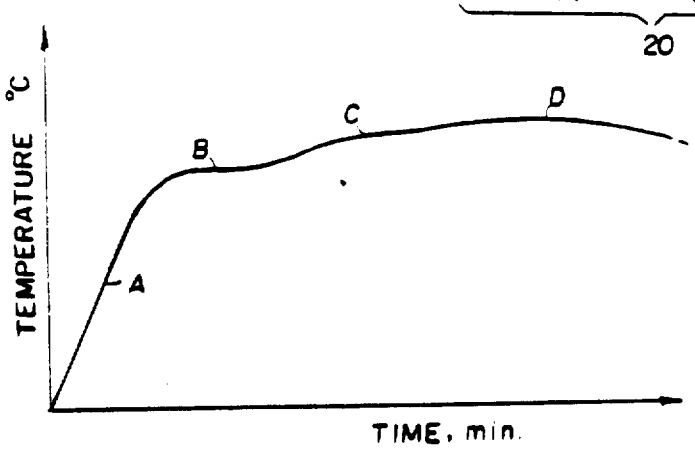
FIG. 3 is a graph diagram relating attained temperature with time following combination of magnesium oxide with ammonium polyphosphate.

That portion of curve 30 in FIG. 3 designated (A), indicating a fast initial rise in temperature, coincides with observed colloid dispersion of magnesium oxyphosphate compounds as colloidal masses ranging from a few hundred Angstrom units to about 0.5 micron. The activation energy required to initiate the reaction of ammonium polyphosphate with MgO at the grain surfaces is supplied by hydration resulting from the wetting of grain surfaces by the liquid medium contiguous to the solid particles. The colloid masses manifest a mobility which is of great importance in the present invention. Colloid migration has been observed through distances of several hundred microns while the reaction is proceeding. The migration appears to be effected both by capillary transport of the suspending liquid or by mechanically-induced pressure gradients therein, and by electrostatic forces within the electrolyte solutions, i.e. by Brownian movement.

Substantial transport of colloid matter is effected by liquid issuing from a porous reservoir such as ligneus matter contiguous to MgO grains, and by re-absorption of liquid into the wood. This mechanism enables the distribution of reaction products and loading of pore spaces of a woody substrate thereby, in a manner quite dissimilar to the formation of a binding mass around refractory aggregate particles from a surrounding solution of ammonium polyphosphate. When the solution is carried as a partial filling of hollow tracheid spaces in wood and the surface of the wood carries grains of MgO and mineral extender grains, an outward migration of liquid occurs which causes lively local motion of wetting films which move about grain surfaces and carry suspended colloid masses. A significantly large transport of such masses deposits them at some distance from the grains within the wood pores. The formation of crystallised oxyphosphate compounds loading a wood surface may be seen from FIG. 4, which shows that mineral material 31 has been deposited within lumens of tracheids of a softwood by entry of colloid masses through bordered pits 32 accessible to fluid migrating from the vicinity of grains 33 of an adhered mineral deposit 34. Deposited Phosphate salt is 35.

No ammonia is liberated as gas during the initial warming represented by curve portion (A) (FIG. 3). As the reactants warm a decreasing capacity of the liquid to retain ammonia leads to evolution of gas.

A critical temperature must be reached before gelation takes place. The slightly endothermic process of breaking of the phosphate-$NH_3$ bonds is evident from the temperature plateau at curve portion (B). The time interval between the wet paste stage and its actual solidification may vary considerably, as the transition appears to depend on factors such as the composition of the grain mixture, the ratios and amounts of grain sizes, the concentration of dissolved ammonia, and the temperature. For example, a high ratio of inert solid filler grains with respect to active MgO grains lengthens the interval, as does retention of dissolved ammonia, e.g. where the reaction proceeds at an elevated pressure.

With slowly-reacting grain mixtures, as where the inert grain mass is in high proportion, the initial temperature rise depicted by curve portions (A) to (B) may not exceed 30° C. to 35° C., and gelation may be delayed to 30 minutes or longer following initiation of the reaction. In extreme cases gelation may take several hours. With small high-purity grain sizes, e.g. in the 5 micron to 20 micron range, and with a higher proportion of MgO to inert filler grains, the initial exothermic reaction may raise the temperature of the reactants to 55° C. to 60° C., and the gelation may set in almost instantaneously or within 3 to 5 minutes. It will be evident that a setting behaviour can be selected to correlate with the particular process for which the invention is used.

The practical significance of the gel point in processes for bonding porous solids such as ligneus fragments is that colloid mass mobility at this state is greatly restricted by reduction of water volume and solution availability as immobile material encloses the surfaces of MgO grains. Virtual stoppage of the combination of phosphate ions with the grains may occur when only a 2 micron to 5 micron surface layer has been reacted. An increased evolution of ammonia gas also occurs at this stage and continues as the compounds formed further harden. The surface appearance of the reacting grains dulls where earlier it had been wet and shiny. The reaction becomes irreversible once the stage represented by curve portion C has been reached, and cannot be stopped even if the reactants are exposed to a large excess of water, which may be sea water.

An important factor in reducing the amount of water present is the linking of molecules of water of crystallization to the oxyphosphate molecules, as may be seen from the equations previously mentioned. The reaction of magnesite which yields no free water particularly reduces available fluid. The crystal forms of the orthophosphate and pyrophosphate, which are respectively in the monoclinic and tabular monoclinic systems, are established at growth sites and the compounds co-crystallise and interlock to form relatively larger volumes of binder in relation to the volume reduction of MgO grains.

Hardening of the gelling compounds is correlateable with the final temperature rise indicated by transition from curve portion (C) to plateau (D) when the hardened reaction products attain 50% to 75% of their ultimate strength. The release of ammonia gas may continue slowly for some hours or even days, depending on the curing temperature. Maximum compound strength is reached at a moisture content of 8% to about 10%, and ammonia has largely escaped.

Continuous casting processes for which shorter reaction times for the basic metal compound with ammonium polyphosphates would be practicable may use a grain mixture (hereinafter to be referred to as "cement solids") with a high proportion of MgO of high density relative to the inert or weakly inert grain portion. The MgO preferably would be of highly reactive state, as represented by USP grade material or dead-burned dense grain rather than merely calcined magnesite. As inert or weakly-reactive filler solids there may be used magnesite of raw form, or a dolomite, or other inert solids of suitable particle sizes such as silica, zirconia, alumina, and alkaline earth metal phosphates and silicates, in the ratio of a fraction of the amount of MgO up to 100 times the weight of MgO.

When the surface of wood of high moisture content receives ammonium polyphosphate solution followed by deposition of powdered cement solids, a higher fluidity of the liquid/solid mixture prior to gelation tends to make [unneven] *uneven* the cladding thickness by dripping and flowing. The early liberation of water produced in the reaction tends to prolong retention of ammonia and postpones gelation. In addition the reverse osmotic gradient present when air-dry wood is pre-impregnated and then coated by cement solids, which gradient draws water into the stored solution and transports colloidal oxyphosphates, is either absent or weak when the wood has a high moisture content, or when a mixture of cement solids and aqueous solution is applied to surfaces of wood devoid of solution.

It is generally desirable for optimum cladding layer formation and compound adhesion strength to wood of any plant species to pre-absorb the solution and then apply powdered cement solids, although satisfactory products can be realised when air-dry ligneous fragments receive the liquid/solid mixture simultaneously;

inferior products result from such application to green or wet fragments.

GRAIN SIZE AND GRADING

The selection of the maximum grain size of MgO and the weight ratios of a range of decreasing sizes of the grains to be used as the reactive portion of the cement solids, and the total bulk and weight of cement solids to be adhered on each square centimeter of fragments surfaces, requires taking into consideration such factors as the reactivity of the grain surfaces, the grain form, the ratio of true solid volume to deposit volume, the degree of penetration by colloidal reaction products into contiguous wood zones, and the volume of gases entrained in the formed binder. A further, important concern is the speed of setting of the binder mass and the minimal application time needed to bring the grains into contact with the fragments and solution and the minimal assembly and forming time for casting the composite into a mold under the desired compaction pressure.

The optimum binder deposit whether formed on an isolated wood surface area or as a junction binder mass between closely-spaced surfaces of fragments theoretically would comprise an almost wholly-absorbed crystalline mixture of magnesium oxyphosphate compounds within pores and openings throughout a near-surface zone extending in depth up to 100 microns or more, and a minimal cladding layer of void-free mineral solids bonded together by the compounds and bonded to the wood surfaces. For lowest binder cost such intervening layer of solids should be as thin as possible. If very small grains are used, having specific surface above about 1500 $cm^2$ per gram, the amount of oxyphosphate compounds developed would suffice to supply a volume of colloids capable of entering into the wood openings and of binding a very thin solids layer to the surface, but such material sets so rapidly that an assembly of fragments cannot be done quickly enough to ensure a strong bond. Nevertheless, a minor amount of magnesium oxide may usefully be applied as grains smaller than about 15 microns to develop a portion of the oxyphosphate compounds prior to application of the major deposit forming the actual binder mass.

If granular magnesia of high density and uniform particle size larger than about 0.3 mm is applied in an amount of 20 to 60 milligrams or more per square centimeter of fragment surface and exposed to contact with aqueous polyphosphate solution, the formed mineral deposit sets slowly and is weakly bonded, particularly at the lower applied weights, and little bond rooting is developed. A single layer of such grains, if of spherical form and closely packed, occupies only about 60% of a volume equal to the plan area of the layer multiplied by the diameter of each grain. Such deposit cannot generate sufficient binding compounds to occupy the 40% void volume between the grains, and can supply only negligible colloidal material for entry into wood openings.

This may be appreciated by considering that if the surface reactivity of a grain of 0.3 mm transverse dimension of high quality dead-burned dense magnesia permits only an outer surface zone of thickness 3 or 4 microns to become converted to the orthophosphate and the pyrophosphate of magnesium regardless of the presence of an excess of aqueous ammonium polyphosphate solution, the core portion amounts to more than 96% of the original grain weight. By comparison, a smaller grain, of say 50 micron transverse dimension, having a surface layer also of 3 to 4 microns reacted, will have an unreacted core portion which is 78% of the original weight. Even when a range of grain sizes having specific surface values from about 60 $cm^2$ per gram to about 600 $cm^2$ per gram forms the powdered cement solids applied to a wetted wood surface, a major weight portion remains unreacted and the deposit when cured has a thickness not less than the thickness of the initial deposit.

Efficient use of MgO as a surface deposit of given weight per square centimeter of wood surface necessitates packing the deposit with the least void space between grains, hence a range of grain sizes should be chosen which will minimize the inter-grain space which must be filled by oxyphosphate colloidal matter and therefore provide ample colloidal matter for entry into wood spaces. As known in the prior art of making concretes with graded sands, a packing ratio of at least 80% and preferably above 90% favors the formation of a well-bonded mineral mass by a small volume proportion of setting compounds. One grading of granular dead-burned magnesium oxide which has provided a relatively high bulk density of applied cement solids powder of approximately 150 micron depth, having suitable specific surface value and reactive weight percentage, is tabulated below:

TABLE I

GRAIN SIZES FOR 100-GRAM SAMPLE OF DEAD-BURNED MgO

| Screen opening, mm | percentage retained on screen |
|---|---|
| 0.149 | nil |
| 0.105 | 22 |
| 0.074 | 26 |
| 0.052 | 28 |
| 0.044 | 18 |
| pan | 6 |

The screen sizes are based on square openings.

With reference to FIG. 5, the diagram represents the weight percentages of granular MgO of suitable gradings with different maximum grain sizes, and shows the weight percentages of MgO which remain unreacted, and of developed oxyphosphate compounds resulting from the reaction with an excess of available ammonium polyphosphate solution of specific gravity 1.4. The diagram shows that a greatly increased weight proportion of oxyphosphate compounds is provided as the maximum grain size of graded MgO powder decreases from about 0.25 mm. If the actual volumes of unreacted MgO and of formed oxyphosphate compounds are plotted, the volume proportions are even more striking because of the lower density of the mixed oxyphosphates (about 2.65) in relation to the density of the MgO (about 3.36).

For a range of grain sizes as shown in the Table, the volume ratio of oxyphosphate compounds to grain core volumes was observed to be about 3.5 and the total binder deposit adhered on free wood surfaces was about 165 microns with evidence of penetration of crystalline binder material into wood openings to a depth at least 60 microns, and a junction bond mass of thickness at least 325 microns was formed between contiguous fragment surfaces held compacted during the setting of the binder.

It may also be seen from the diagram, FIG. 5 that when the packing ratio of the applied MgO grain layer of sizes below about 0.25 mm is 0.85 or higher, the volume of oxyphosphate compounds produced is more than sufficient to occupy all void spaces in the layer and to provide compounds for filling accessible wood spaces adjacent to the layer. With certain lower-density magnesia grains of high specific surface value the chemical combination with the phosphate solution is likely to cause rapid early set of the compounds, making difficult or impractical the assembly of fragments such as strip or straw elements requiring careful positioning in successive layers. It is however practicable to dilute the MgO layer by admixture with either partly or wholly inert granular solids as earlier discussed, without impairing the strength of the binder mass or its adhesion to wood surfaces, provided that the volume of binding compounds generated is sufficient to wholly occlude both the grain cores and the filler grains. The range of sizes of the added solid grains should generally conform with the size range of MgO grains of the mixture.

The total surface area of cement solids containing inert or nearly-inert particles admixed with MgO grains is correspondingly increased, allowing aqueous solution to move by capillary action and colloidal products to disperse at least as freely as when solely MgO grains constitute the layer.

When it is desired to substitute particulate solids for a portion of the MgO grains, the additive comprising a material of density lower than that of the MgO, the volume of such additive must be correlated with the available reduced quantity of binding compounds corresponding to the reduced amount of MgO remaining, in order that the increased bulk of solids may be adequately bound and the deposit anchored in the wood surfaces adjoining.

For example where silica grains of the same range of grain sizes and relative amounts, having a density of 2.63 are to be used to replace part of a 100-gram quantity of MgO grains of density 3.36, and where from inspection of volume yield of oxyphosphate compounds indicated in FIG. 5 it is evident that only 60 grams of the MgO would bind the equivalent solids volume of 100 grams and also fill spaces of adjacent wood to a desired depth such as 60 microns, the amount of filler should not exceed the weight indicated from the following calculation:

$$\text{Silica wt.} = \frac{\text{Original MgO weight} - \text{Chosen wt. of MgO}}{3.36} \times 2.63$$

which in the present case would be calculated as:

$$\text{weight of silica additive} = \frac{100 - 60}{3.36} \times 2.63 = 31.3 \text{ grams.}$$

Accordingly the cement solids mix would include 60 grams MgO and 31.3 grams of silica grains.

When it is desired to design a mixture of cement solids to form a given thickness of mineral deposit anchored in the wood surface of a given species, assuming the penetration into wood spaces is to be 60 microns depth, the volume of binder compound to fill accessible wood spaces in this zone may be assessed for a wood of density 0.41 by finding the void ratio from the relation:

$$\text{void ratio} = \frac{1.4 - 0.41}{1.4} \times 100 = 70\%.$$

where the assumed species wood solids density is taken as 1.4.

The estimated anchoring deposit of about 9 milligrams per $cm^2$ of wood surface may be used as the basis for determining the ratio of MgO grains to total cement solids for a junction mass of thickness 250 microns bridging between extended flat surfaces of wood by the following procedure.

The average mineral solids deposit on each wood surface will be half of the junction bond mass thickness, i.e. 125 microns.

The amount of oxyphosphate binder for binding a packing of mineral solids of a selected grain size range as in Table I may be reduced for a packing ratio of 86% as:

$$(0.0125 \times 2.2)/0.86 = 0.0319 \text{ grams}$$

where the average density of the binder compounds is 2.2.

The supply of 31.14 mg of MgO grains per $cm^2$ of surface area provides the combined binding and wood-filling requirements which are:

$$[0.0319 + 9 = 0.0409 \text{ grams/cm}^2.]$$
$$0.0319 + 0.009 = 0.0409 \text{ grams/cm}^2.$$

as may be verified by reference to FIG. 5 showing that 100 grams total MgO furnishes 131.31 grams of the binding compounds.

The weight of silica which may be used to make up the deposit thickness if found from the calculation:

$$\text{silica weight} = 2.63(0.0125 - 0.03114/3.36) = 8.50 \text{ mg.}$$

Accordingly the cement solids comprise a total weight of 39.64 milligrams per $cm^2$ of wood surface area, as a mixture of 78.55% by weight MgO and 21.45% silica.

When the sole reactive grain material in a cement solids mixture is magnesia, ammonia gas formed according to the chemical equation previously mentioned is expelled from the binder mass partly into wood spaces and into void spaces between fragments as the mineral deposit is heated by formation of oxyphosphate compounds. The greater part of the ammonia gas which is evolved in early stages, i.e. within a few minutes from the bringing together of the components, escapes while the colloid materials are plastic, and a minor portion remains trapped as the compounds gel, thereby imparting a vesicular character to the deposit. The bubble volume actually locked in the binder mass is not greater than from about 20 to 35% of its volume.

It has been found that raw dolomite, consisting chiefly of magnesium carbonate with impurities such as silica and calcium carbonate, when ground in its raw state and dried but not calcined and screened to a suitable range of particle sizes, is so weakly reactive with ammonium polyphosphate solution of 10-34-00 analysis that at room temperature there is negligible reactivity, unless external heat is applied to the reactants. The reactive portion of dolomite grains in the sizes and weight proportions of TABLE I has been found to be considerably less than for high-density MgO. One dolomite which was tested extensively, of density 2.62, exhibited between about 5% and 14% of the effectiveness in production of oxyphosphates as the same weight of MgO of density 3.36. Nevertheless the addition of ground raw dolomite to MgO grains confers the advantage that the speed of setting of the mixture is moderated when up to three parts by weight of dolomite grains are admixed per part of MgO. The ratio of vesicle volume to total binder mass is reduced.

Ammonium carbonate which has been shown to be formed by combination of magnesium carbonate with ammonium phosphates is a weak electrolyte which migrates freely in liquid occupying wood spaces, eventually lodging as a crystalline deposit of the salt within tracheids and wood pores, which deposit augments the ammonium phosphate compounds remaining in the wood after curing, if an excess of solution has been supplied. It is believed that the presence of ammonium carbonate enhances the fire-retarding action of the ammonium phosphate deposit.

The proportioning of a cement solids mixture including ground raw dolomite is far less critical than with wholly inert solids such as silica, alumina, zirconia, magnesium and calcium silicates, and magnesium and calcium phosphates. This will be evident if the effect of a given volume of dolomite on the supply and distribution of oxyphosphate compounds is considered. From FIG. 5 the yield of such compounds from the given volume calculated for the reactivity rates observed after adjustment for the difference in density of dolomite as compared with that of magnesia, would range from about 0.19 to about 0.38 volumes per volume of non-reacting dolomite grain portions. At the packing factor of 0.86 for grain grading according to TABLE I, it can be seen that sufficient binding compound volume would be produced to bond completely relatively large volume ratios of dolomite to MgO. However as a practical limitation a ratio of 4 parts of dolomite by weight to one part of MgO tends to make for delayed setting and insufficient bonding due to an insufficiently high temperature during the first five or ten minutes to accelerate the dolomite-phosphate reaction. A satisfactory ratio has been found to be from 2 to 1 to 3 to 1 by weight, and equal parts by weight perform well but are slightly less economical.

Other solid additives which may be very slightly reactive and which provide strong binder masses are the calcium and magnesium silicates and phosphates. These solids appear to form, when present in finely-divided state, sites for crystal attachment of the binding compounds undergoing gelling. Their use should be on the same basis as silica grains.

For a more complete illustration and understanding of the process details for making mineral clad and bonded ligneus bodies with ammonium polyphosphates and earth metal oxides, hydroxides and carbonates descriptions of practical procedures, arrangements and products are offered as outlined in the following examples.

EXAMPLE I

The fact that ligneus fragments of all species reported in following examples may be successfully bonded by the oxyphosphate mineral binder of this invention strongly suggests that the reaction between ammonium polyphosphate and [magnesian of] *magnesium or* calcium cement solids is substantially unaffected by exudates such as sugars and polyphenolics. Heretofore it was known that many woody plants carry within their lignocellulosic structure quantities of organic substances which, on addition of water and prior art cementing mineral compounds, are leached from the woody material and affect adversely the setting reaction of the cement.

To determine the tolerance of magnesium oxyphosphate reaction compounds discussed in the present specification to soluble sugars, as represented by dextrose, a series of mineral plugs were cast from mixes consisting solely of dextrose sugar, ammonium polyphosphate aqueous solution, and cement solids, using constant proportions of cement (75% by weight) to solution (25%) and varying the weight percent of the sugar from zero to 5%, expressed as percentage of the combined weights of solution and cement solids. The cement solids were of grain size passing 100 mesh and retained on 200 mesh screen, 70% passing 150 mesh. The cement comprised 25% by weight of dead-burned magnesia of density 3.26 and 75% of ground raw dolomite of density 2.62 analysing 45.1% $MgCO_3$, the balance being chiefly silica $CaCO_3$.

All plugs were cast without compaction and were released from the plug mold after 15 minutes in hardened condition and allowed to dry for 7 days. The strengths observed show no significant impairment of compressive strength, but a consistent decrease of MOE with increasing sugar content, which is inferred to result from the crystal volume of sugar distributed in the mineral concrete structure.

TABLE II

| | | COMPRESSION STRENGTH MEASURED | |
|---|---|---|---|
| TEST No. | DEXTROSE % | *Crushing strength $Kg/cm^2$ | Modulus of Elasticity $Kg/cm^2$ |
| 1 | nil | 255 | 283,300 |
| 2 | 1 | 241 | 231,100 |
| 3 | 2 | 284 | 217,400 |
| 4 | 3 | 202 | 205,100 |
| 5 | 5 | 241 | 160,500 |

*Plugs diameter 3.0 cm, height 8 cm.

From the previously-observed satisfactory setting of the binder when the ligneus fragments comprised green Western Red cedar (Thuja plicata) including bark and heart-wood, the cementing action appears not to be affected by contaminants in the fragments which would impair or prevent setting of prior cementing compounds.

It has also been noted that the mineral binder mass hardens equally well when in direct contact with a pitch pocket in Sitka spruce (Picea sitchensis), with an adhesion strength such that on breaking the binder away, pitch remained adhered to the mineral.

EXAMPLE II

The partial impregnation of wood by ammonium polyphosphate solution and subsequent drying to retain a crystalline residual salt deposit within lumens and pores greatly enhances the strength properties, the improvements increasing generally with loading up to the physical limit. It has also been observed that when an adhered mineral deposit of metal oxyphosphate is attached to the wood surfaces as a continuous anchored layer, the impairment of strength resulting from fissuring and cracking produced by cutting and crushing processes of forming the fragments is not only offset, but the fragment gains in intrinsic bending and compressive strengths and in the modulus of elasticity of the wood, exceeding by a large percentage the air-dry values for clear whole-wood specimens. The improvement is inferred to result from the presence of a shell of mineral-vegetable material at the fragment surfaces, in which the in-situ generated oxyphosphate compounds have migrated for distances up to 30 to 150 microns [on] *or* more prior to the setting of the compound. When both a crystalline salt deposit is retained within the fragment upon drying of absorbed ammonium phosphate solution, and an in-surface mineral layer is anchored by crystallization of colloidal metal oxyphosphates which have migrated into minute surface openings, the total strength enhancement is outstanding. For example, the increase of compression strength parallel to the grain in Aspen, or Red Alder, ranges upwards of 100%, accompanied by large increases of modulus of rupture (MOR), modulus of elasticity (MOE) and tensile strength to a lesser degree.

To illustrate the beneficiation of wood fragment strength properties by impregnating into the wood sufficient amounts of ammonium phosphate salt to impart fire retardant properties, and by adhering a mineral deposit of oxyphosphate compounds in which filler solid grains are embedded, eight sets of specimens of Aspen wood of density 0.38 in air-dry state were prepared from clear billets as beams of section 9 mm by 9 mm, and lengths 11.0 cm.

Two specimens were used in each of four tests (A) to (D) to measure static bending strength as a beam and compression strength parallel to the grain as a short column held at its ends. Three specimens were prepared for each of the tests (E) to (F) to measure the MOR and MOE values, the compressive strength, and the tensile strength alone without bending at rupture.

Test (A) obtained reference strength values for whole wood as MOR, MOE and compression strength. The static bending test was carried out with the specimen resting at its ends on supports spaced by span distance L with a load applied at the mid-span position increasing gradually, e.g. by advancing a load [heat] *head* at the rate of 0.05 cm per minute with continuous indication of applied magnitude. The following formulae were used for calculation:

$$MOR = \frac{3\,PL}{b \cdot c^2} \quad MOE = \frac{PL^3}{4b \cdot d^3 \cdot y}$$

The beam depth and width respectively (d and b) are 0.9 cm. P' is the load to proportional limit at which time the deflection y in cm is read. P is the load read at rupture.

Compression parallel to the grain was determined by supporting a second specimen as a column with its ends held in close-fitting seats, applying a steadily-increasing load, and observing the magnitude at failure.

Tests (B) were carried out similarly, with oven-dried wood, showing expected strength increases as has long been understood.

Tests (C) involved wet wood, having absorbed therein an amount of solution 0.47 grams per gram of wood, corresponding to a salt loading of 178 milligrams per cubic centimeter, which is an amount nearly three times the amount regarded as imparting acceptable fire retardant properties. As expected, the MOR and compressive strength of the wet wood were lowered, but the MOE exceeded that of air-dry wood.

Tests (D) were carried out on sticks which had been tempered to air dry moisture content after absorption of solution to retain a lesser amount of salt deposit of 140 milligrams per cc and re-drying. All strength properties were exceptionally improved.

Tests (E) used air-dry sticks which had received an impregnation load of 65 milligrams of ammonium phosphate per cc whereas tests (F) were carried out on sticks which contained little salt residue but also were coated by a formed mineral deposit on the wood surfaces weighing about 36.5 milligrams per $cm^2$ which had been formed by in-situ reaction between a wetting film of aqueous ammonium phosphate solution and a powder coating of dead-burned magnesium oxide grains of density 3.36 in a range of particle sizes below 100 mesh down to +250 mesh, in amount 30 milligrams per $cm^2$. The amount of the wetting film was about 15 milligrams per $cm^2$ of stick surface. The cured deposit had a mean thickness estimated at 140 microns and bridged the residual magnesium oxide grains. The cementing material included about 10.5 milligrams of magnesium oxyphosphate compounds occluding about 26.5 milligrams of unreacted magnesium oxide grains. From microscopic examination the mineral deposit was inferred to have extended into pores and tracheid openings and to have formed crystalline masses extending at least one cell depth from the wood surface, and to occupy at least portions of the microspaces within an outer 50-micron-deep wood zone extending inwardly of the stick surface From tests (D) it will be apparent that ligneus materials are strengthened and stiffened to a marked degree by an impregnating salt deposit. The combined effects of both internal salt deposition and surface cladding by intimately adhered mineral binder is a still further strength gain. Tests (E) show the strength enhancement contributed by a minor volume of adhered surface mineral deposit. The absorption of ammonium polyphosphate in any practical amount leads to a surprising and unexpected improvement in bending and compression strengths. The test data reports strength values in cast structural products far exceeding those known from any prior art vegetable/mineral composites.

The modest or even negative tensile strength differences noted for tests (E) or (D) and (F) can be attributed to the fact that mineral binders are weak in tension. Claddings of 70 microns to 200 microns thickness cannot be expected to contribute usefully to the tensile strength of a vegetable substrate, especially in view of the large difference of the respective elastic moduli. The cement coating initially takes up most of the tension and shear stresses created by the differential elongations of the substrate and coating, failing long before maximum tensile stress can be developed in the substrate. The initially-higher strength of cement-coated composites undergoing loading is evidenced in the stress/strain curve only up to 20% or 30% of the breaking load, the more curved portion pertaining obviously only to elongation of the wood.

The most important benefit [comferred] *conferred* by the combination of an internal impregnation load of salt and an adhered surface cladding of mineral deposit is obviously realised when the composite is subjected to compressive stress parallel to the loaded surfaces, as may be seen from tests (E) showing a strength improvement of 175%.

TABLE II

EFFECTS OF LOADINGS OF AMMONIUM POLYPHOSPHATE AS IMPREGNATING SALT DEPOSIT IN ASPEN (Populus Tremuloides) CLEAR COLUMNS AND BEAMS, AND OF SURFACE DEPOSIT OF MAGNESIUM OXYPHOSPHATES OCCLUDING MAGNESIA GRAINS

| | WOOD TREATMENTS | | | | | | | Max. | | | |
|---|---|---|---|---|---|---|---|---|---|---|---|
| TEST No. | Moisture Content, Weight % | Surface Deposit mg/cm² | grams Salt per cc | Modulus of Rupture, kg/cm² | incr % | Modulus of Elasticity kg/cm² | Incr. % | Crush Strength kg/cm² | Incr. % | Tensile Strength Kg/cm² | Modulus of Elasticity kg/cm² |
| A | 8.72 | — | — | 720 | — | 73,000 | — | 408 | — | 1050 | 69,500 |
| B | 1 | — | — | 820 | +14 | 98,000 | +34 | 527 | +29 | — | — |
| C | 56 | — | 0.718 | 610 | — | 92,300 | — | 287 | — | — | — |
| D | 7.9 | — | 0.140 | 1290 | +79 | 125,000 | +71 | 952 | +133 | 670 | 72,000 |
| E | 8.72 | 36.5* | 0.140 | 1740 | +142 | 142,000 | +95 | 1120 | +175 | 1010 | 97,700 |
| F | 8.72 | 36.5* | 0.005 | 950 | +32 | 99,500 | +36 | — | — | 668 | 77,000 |

*26.5 mg MgO, 10 mg magnesium oxyphosphates, 160 to 200 macron layer

MINERAL-LIGNEUS COMPOSITE STRUCTURAL PRODUCTS

EXAMPLE III

Screened spruce fragments passing 10 mesh and retained on 20 mesh screens, having 8.3% moisture content in air-dry condition were divided into nine samples and treated with varying amounts of ammonium polyphosphate solution of specific gravity of 1.4 of analysis 10-34-0. Each sample was coated with a constant weight of cement solids passing 100 mesh screen consisting of 75% ground dolomite and 25% dead burned MgO in quantity equalling 2.5 times that of wood (weight). The weight of the solution was varied in three steps. No compaction pressure was applied to the mixture during casting into plugs of length and diameter respectively of 7.7 cm and 3.03 cm. Compression testing to failure was carried out on a universal testing machine just 30 min after casting the plugs. The data shows highest early strength for samples 2, 3 and 6. The results are given in Table III

TABLE III

| Test | Wood Weight | Cement Dolomite | solids MgO | Solution weight | Product Density | Compressive Strength, kg/cm² |
|---|---|---|---|---|---|---|
| 1 | 1 | 2.25 | 0.75 | 1.50 | 0.82 | 17.9 |
| 2 | 1 | 2.25 | 0.75 | 2.10 | 0.86 | 26.4 |
| 3 | 1 | 2.25 | 0.75 | 2.70 | 0.93 | 26.7 |
| 4 | 1 | — | 3.00 | 1.50 | 0.82 | 12.7 |
| 5 | 1 | — | 3.00 | 2.10 | 0.86 | 20.0 |
| 6 | 1 | — | 3.00 | 2.70 | 0.93 | 26.8 |
| 7 | 1 | 2.95 | 0.05 | 1.50 | 0.82 | 15.1 |
| 8 | 1 | 2.95 | 0.05 | 2.10 | 0.86 | 17.9 |
| 9 | 1 | 2.95 | 0.05 | 2.70 | 0.93 | 18.8 |

EXAMPLE IV

In Table IV compressive strength for composite ligneous fragment castings of numerous species indicative of the wide range of applicability of this bonding technnology is given where the screening fragments of passing 5 mesh and retained on 20 mesh were treated to remove the green moisture to 8% residual moisture content followed by application of weighed portions of ammonium polyphosphate solution of 10:34:0 analysis and uniform cement weights consisting of 75% dolomite and 25% MgO (dead burned). The wood:cement ratio was 1 part wood to 3 parts of cement solids and the wood to ammonium polyphosphate ratio was 1 part of wood to 2.10 parts of solution. The compaction pressure was 1.0 kg/cm² and compression tests followed 30 min, after 15 min heating at 105° C. and 7 days at [20 C] *20° C.* Variations noted in the early strength (30 min) samples are due to the intrinsic particle strength rather the interferance of some wood constituents with the bonding process as noted from the prior art dealing with wood products bonded with Portland cement and other magnesite cements.

TABLE IV

| Test | Lignocellulosic Species | Density | Compressive strength, kg/cm² Curing Mode 30 minutes | 15 min @ 105° | 7 days |
|---|---|---|---|---|---|
| 1 | Spruce | 0.87 | 23.2 | 26.4 | 57.3 |
| 2 | Spruce | 1.07 | 23.5 | 35.0 | 94.1 |
| 3 | Spruce | 1.30 | 28.6 | 46.6 | 114.7 |
| 4 | Spruce Excelsion | 0.45 | — | — | 15.1 |
| 5 | W. Red Cedar | 0.50 | 11.8 | 16.8 | 20.1 |
| 6 | W. Red cedar | 0.77 | 16.9 | 23.2 | 44.9 |
| 7 | W. Red Cedar | 0.96 | 25.5 | 33.2 | 48.8 |
| 8 | W. Larch | 0.89 | 22.7 | — | 59.1 |
| 9 | Black Locust | 1.09 | 25.7 | 43.9 | 93.2 |
| 10 | Keruing | 1.23 | 33.0 | 48.8 | 92.4 |
| 11 | Beech | 1.03 | 20.6 | 44.9 | 64.7 |
| 12 | Hemlock Driftwood | 0.86 | 21.2 | — | — |
| 13 | HembalFir Chips (Wet) | 0.86 | 14.7 | — | 36.6 |
| 14 | Bark Douglas-Fir | 0.75 | 17.1 | — | 23.6 |
| 15 | Cottonwood | 0.58 | 18.0 | 19.2 | 28.5 |
| 16 | Rice Husks | 0.97 | — | 19.2 | — |
| 17 | Bagasse | 0.89 | 17.2 | — | 25.3 |

Where the sample is shown with different cast density, compaction pressures were 1, 2 and 10 kg/cm². The tests show that room temperature curing was superior to that of oven curing and that at higher compaction pressures the attained strength was highest with such cure (7 days at 20° C.)

EXAMPLE V

A series of samples using air dried spruce fragments passing 5 mesh but retained on 20 mesh screen, in the form of slivers of a range of lengths approximately 0.5 cm to 3 cm, was mixed with ammonium polyphosphate solution and cement solids of the same composition used in the previous example, by keeping the proportion of solution to cement solids constant as follows:

TABLE V

| Test | Wood Weight | Cement Solids Weight | Solution Weight | Density | Compression Strength, kg/cm² Curing mode 15 min @ 105° | 7 days @ 20° |
|---|---|---|---|---|---|---|
| 1 | 1 | 2.0 | 1.4 | 0.65 | 8.2 | 29.2 |
| 2 | 1 | 3.0 | 2.10 | 0.87 | 25.5 | 57.3 |
| 3 | 1 | 4.0 | 2.80 | 1.02 | 29.0 | 51.9 |
| 4 | 1 | 5.0 | 3.50 | 1.20 | 43.9 | 122.5 |

The samples were formed with a low compaction pressure of about 0.5 kg/cm$^2$ and the density variation being primarily due to the variation of cement solids used. Tests No. 1 and 2 show that high quality low density products are realisable with relatively low reactant costs.

EXAMPLE VI

Board products of various fragment types, ligneous species and technical description were prepared in molds as described in TABLE VI. The weighed fragment masses were treated first with predetermined amounts of ammonium polyphosphate of 10:34:00 NPK analysis and allowed to soak until all of the solution was absorbed in the fragments. The wet fragments were then dusted with the weighed amount of cement dust of predetermined composition and the mass poured into a mold having polished stainless steel surfaces. The molds were placed into a cold press and the mass compressed to a predetermined nominal thickness and held under pressure for 5 minutes. The hardened boards were removed from the molds and air dried in a forced air cabinet at room temperature for 7 days. The bending specimens measured 6.5 cm by 25 cm supported on a 15 cm span.

The cement filler was −100 mesh raw dolomite and the ammonium polyphosphate was either wet process green or black acid. The MgO was either dead burned or USP heavy powder of 3.54 specific gravity as noted in the TABLE.

being the external fibrous stalk portion lying radially inwardly of a hard waxy and siliceous skin layer, having a thickness ranging from about 1.3 to 2.8 millimeters, having pith attached.

The rind material was prepared as uniform strips by feeding the cane through pressing rollers to flatten it and the cane is then slit to form segments from which by mechanical processes the pith interior is scraped away, and the outer skin layer is abraded to collect components, notably the wax. The flattened segments are longitudinally slit to obtain relatively long (15 to 30 cm) inter-node strips [have] *having* cross-sections about 1.5 to 5 mm wide and thicknesses from just under 1 mm to about 1.8 mm, and substantially free of deleterious waxes, gums, siliceous deposits and pitch adhesions. The strip density as determined by dressing fragments to known volumes and weighing, was about 0.22. The pith side was visibly fissured, and some strips were loosely attached along their long edges by fibrous strands with another strip.

To evaluate the effects of varying the amounts of ammonium polyphosphate solution, the total cement solids, compaction pressure and strip assembly patterns on board density and bond strength of binder deposit, eight test board products were formed each using 200 grams of the oven-dried prepared strips. Because the total weight of solution supplies both the $P_2O_5$ required for a given weight of reactive fraction of MgO and $MgCO_3$ solids, as well as the residual ammonium phosphate salt impregnating the ligneus material, and as this

TABLE VI

| Fragment Type | Composition: kg Wood / Cement solids / Polyphosphate | Nominal Thickness cm | Density | Modulus of Rupture kg/cm$^2$ | Modulus of Elasticity kg/cm$^2$ | Description/composition/Treatment |
|---|---|---|---|---|---|---|
| 1 Western Red Cedar Hog-fuel, 50% Bark | 155 / 385 / 232 | 1.9 | 655 | 21.4 | 12 290 | Fragments: Air dry, ApPh: Green acid Cement solids: 75% Dolomite, 25% DB MgO |
| 2 Western Red Cedar Hog-fuel, 50% Bark | 155 / 385 / 232 | 1.9 | 640 | 7.3 | 9 980 | Fragments: Wet, 50% Moisture, ApPh: Green Acid, Cement solids: 75% Dolomite, 25% DB MgO |
| 3 Western Red Cedar Hog-Fuel, 50% Bark | 155 / 385 / 232 | 1.9 | 655 | 20.6 | 12 000 | Fragments: Air Dry,: ApPh: Black Acid Cement Solids: 75% Dolomite, 25% DB MgO |
| 4 Western Red Cedar Hog-Fuel, 50% Bark | 155 / 385 / 232 | 1.9 | 655 | 18.2 | 10 660 | Fragments: Air-Dry, ApPh: Green Acid, Cement Solids: 98% Dolomite, 2% USP MgO Heavy Powder |
| 5 Western Red Cedar Hog-Fuel, 50% Bark | 155 / 385 / 232 | 1.9 | 655 | 20.9 | 12 090 | Fragments: Air-Dry, ApPh: Green Acid Cement Solids: 95% Dolomite, 5% USP MgO. |
| 6 Alder, Wafers | 180 / 520 / 240 | 1.9 | 870 | 36.9 | 17 500 | Fragments: Air-Dry, ApPh: Green Acid, Cement Solids: 75% Dolomite, 25% DB MgO. |
| 7 Cottonwood Excelsior | 145 / 385 / 232 | 2.54 | 620 | 9.5 | 3 400 | Fragments: Air-Dry; ApPh: Green Acid, Cement Solids: 75% Dolomite, 25% DB MgO. |
| 8 Red Cedar, Planer Shavings | 155 / 385 / 232 | 1.9 | 755 | 15.8 | 8 720 | Fragments: Wet, 50% Moisture, ApPh: Black Acid Cement Solids: 75% Dolomite, 25% DB MgO. |
| 9 HemBalFir Pulp Chips | 155 / 385 / 232 | 2.54 | 655 | 9.6 | 6 140 | Fragments: Air-Dry, ApPh: Green Acid, Cement Solids: 75% Dolomite, 25% DB MgO |
| 10 Sandwich Panel | 155 / 385 / 232 | 2.54 | (655) | 70.0 | 18 310 | Fragments: Core as #1 Mix. Faces: Spruce Veneer, 3 mm Thick. |
| 11 Aspenite Wafers | 185 / 555 | 1.9 | 850 | 18.5 | 11 500 | Fragments: Oven-Dried, ApPh: Green Acid, Cement Solids: 75% Dolomite, 25% DB MgO |

EXAMPLE VII

A series of structural panels was made using oriented ligneus fragments derived from sugar cane rind, this component represents the single largest cost input, it is desirable to be able to reduce the weight of solution while maintaining adequate product strength and resistance to flame.

Moreover, a reduction of total mineral solids decreases the cost of expensive magnesium oxide of the high-density grade which provides the desired reaction rate with ammonium polyphosphate solution. By limiting the compaction pressure and by arranging the fragments so as to obtain the most favorable strength properties for the product in relation to its intended use, optimum low-density and high-strength boards, panels and sheets can be formed.

A first series of three boards was prepared in which the weight ratios of the strips, the cement solids, and the aqueous phosphate solution were, respectively, in parts by weight:

1.00:3.00:1.80.

The cement solids comprised 0.75 parts of magnesium oxide of high density and activity, amounting to 150 grams, of density 3.36, and 2.25 parts of ground dolomite analysing 45.1% $MgCO_3$, the remainder being chiefly silica and $CaCO_3$, of grain density 2.62, in amount 450 grams. The solids were of grain sizes passing 100 mesh screen and retained on +250 mesh, with 70% passing 150 mesh.

The strips were sprayed with 360 grams of a commercial fertilizer grade of ammonium polyphosphate solution of specific gravity 1.4 having 50% by weight of dissolved salt, and solution analysis 10:34:00 in respect of nitrogen (as $NH_4$) and $P_2O_5$ (as phosphate ion). This solution was filtered to remove suspended dark matter believed to be carbonaceous solids.

The wetted strips were mixed to distribute the liquid evenly over the surfaces. It was noted that different parts of the wood seemed to have greater permeability to the liquid than other areas, the pith side accepting liquid freely. The solution was absorbed by the greater part of the fragment surfaces within about three minutes from its application, to the extent that the strips were slightly moist to touch.

The estimated enclosing volume of the fragments, not taking into account the fissures, was calculated to be about 10.700 $cm^2$ per 100 grams of rind strips. The applied solution represented a layer amounting to 33.6 $mg/cm^2$ of surface, providing 9.88 milligrams of $P_2O_5$ as reactive component.

The cement solids were then sifted over the cane strips while the fragments were tumble-mixed, and the tumbling was contained for about 20 seconds to distribute the free powder until all the cement grains were adhered. One-third of the coated strips were then immediately shaken into a flat mold with side flanges, of bottom plan area 15 cm by 30 cm. The strip lengths of this layer were aligned generally in parallel and the layer levelled, after which a second one-third portion was transferred into the mold and raked to orient the strips parallel with each other and at a small angle with the first layer; the remainder of the coated strip mix was added with these strips being laid nearly parallel with the first layer strips. A compaction pressure of 0.5 $kg/cm^2$ of the top area was applied to the composite by a stainless steel pressure plate having a polished contact face, holding the fragments compacted to form a board of thickness about 3.17 cm. The plate was held at this distance from the bottom of the mold for 5 minutes. At this time the plate was removed and the product was taken out while hot and steaming, giving off an odor of ammonia gas, at a temperature of 44° C. It was dried in air for 5 days.

In a similar way, boards #2 and #3 were formed, with compaction pressures respectively 0.7 $kg/cm^2$ and 7.6 $kg/cm^2$. The corresponding board thicknesses, determined by fixing the plate at the distance from the mold bottom according to the initial position for the attained compaction pressure, were respectively 2.12 cm and 1.19 cm.

Two further boards, #4 and #5 were prepared with the same components, but with the cement solids and solution decreased from the amounts used in the boards 1-3, the ratios by weight being:

#4 1.00:2.50:1.50

#5 1.00:2.50:1.25.

Board #4 was compacted at 12 $kg/cm^2$ pressure, producing a thickness of 1.90 cm, while board #5 was held compacted at 4.5 $kg/cm^2$ producing a board thickness of 2.74 cm. The "springiness" of the assembled strip materials was clearly apparent from the pressure increase needed to compact the fragments by 0.8 cm thickness.

To explore the feasibility of producing strong board products with markedly decreased amounts of mineral cement solids while using a decreased amount of ammonium polyphosphate solution contributing good fragment-stiffening and fire-retardant properties, boards #6 and #7 were prepared by the procedures described for the first five boards. The weight ratios of the components were as follows:

#6 1.00:2.00:1.20

#7 1.00:1.00:1.30

The boards were held under respective compaction pressures of 11.6 $kg/cm^2$. The difference in the amounts of cement solids being the primary cause of respective densities 1.07 and 0.79.

To test the efficacy of bonding by markedly lower amounts of cement solids and aqueous solution, board #8 was prepared by the procedures described earlier, using the weight ratios:

#8 1.00:0.93:1.10

All strips were laid flat and parallel in the mold. The strength of the cured board at seven days of drying air was excellent, and the board costs were appreciably lower than for the other boards. This product would be suitable for wall construction as sheathing, having good nailing and fastener-holding properties in common with all boards of the group.

While the texture of the board surface was rough and it was pervious to air movement, it would have use as a decorative finish panel.

All of the boards of the series, #1 through #8, would be equally castable to form a core board having a continuous face sheet on one or both major surfaces, as conventional in the manufacture of wall panels and boards. Such face sheet may comprise any porous strong layer such as kraft paper whether bleached or unbleached, a porous plastic film such as a perforated vinyl or polyester film or a sheet of woven textile made with natural or artificial strands, yarns or monofilaments, or it may be a wood veneer. The application of such facing sheet or sheets can readily be done either during the casting of the board or after mounting of the structural product on a wall or ceiling. An integral face sheet may be laid on the bottom of the mold box prior to assembling the fragments, and if desired a second sheet of the same or a different material may be placed on the upper surface of the fragments prior to applying compaction pressure. While the migration of binder and solution to the contiguous surface of the sheet from outer fragment portions can adequately bind the face sheet to the core, if desired the inside surface of the one face sheet laid on the mold bottom can be loaded by a sprayed-on wetting film of ammonium polyphosphate solution and a dusting of cement solids just before the treated surface receives the coated fragment mass. Similarly, the under-side of the top sheet if one is to be bound to the core may be treated to ensure strong adhesion.

Post-cure application of a face sheet may be done at any time by similar procedure, provided that an adequate pressure is exerted to hold the face veneer, board, paper, card, or woven or mat sheet closely contiguous to the core so that reactant wetting film and powdered cement solids may form junction bond masses linking the face sheet to the outer fragments.

TABLE VII

TABLE OF PROPERTIES OF COMPOSITE BOARD PRODUCTS CAST USING SUGAR CANE RIND STRIPS FREE OF PITH AND OUTER SKIN PORTIONS

| Broad No. | Weight of ligneus strips | Proportions of Cement Solids | Proportions of Ammonium Polyphos. | Compaction Pressure Initial Kg/cm² | Bulk Dens. | MOR Kg/cm² | MOE Kg/cm² | Thickness cm |
|---|---|---|---|---|---|---|---|---|
| 1 | 1.0 | 3.00 | 1.80 | 0.5 | 0.34 | 10.4 | 11,300 | 3.17 |
| 2 | 1.0 | 3.00 | 1.80 | 0.7 | 0.53 | 37.8 | 35,100 | 2.12 |
| 3 | 1.0 | 3.00 | 1.80 | 7.6 | 0.93 | 169.5 | 65,100 | 1.19 |
| 4 | 1.0 | 2.50 | 1.50 | 12.0 | 1.05 | 150.7 | 56,300 | 1.90 |
| 5 | 1.0 | 2.50 | 1.25 | 4.5 | 0.75 | 30.1 | 17,700 | 2.74 |
| 6 | 1.0 | 2.00 | 1.20 | 11.6 | 1.07 | 177.1 | 62,350 | 1.67 |
| 7 | 1.0 | 1.00 | 1.30 | 11.6 | 0.79 | 142.0 | 41,100 | 0.75 |
| 8 | 1.0 | 0.93 | 1.10 | 4.5 | 0.34 | 32.7 | 31,300 | 1.72 |

The exceptionally high MOR values measured for boards Nos. 3, 4, 6 and 7 pertain to thicknesses substantially lower than were obtained at the lower compaction pressures used for boards Nos. 1, 2, 5 and 8. Because cane rind is a highly compressible fibrous material, the strips are intimately brought together along their entire lengths with adjacent strips, and the relatively small void space resulting is largely filled by fluid expressed from the highly porous woody material as the wood volume decreases. This decrease may be 30% of the free bulk volume of the strips. The binder mass which forms adjacent to the major surfaces of the mold and which therefore is at the extreme fiber position of the board contributes high beam strength and stiffness. The interface between fragments provides a maximum area of junction in shear capable of resisting bending moment due to applied load. The MOR values reflect the advantages of using the longest possible fragments such as strips, stalks, slivers, flakes and veneers where a very strong product is desired.

It is also evident that where the quantity of residual salt solution held in the woody matter and the continuous cladding by mineral solid bridging substantially all inter-fragment spaces is favorable, as in the denser cane rind assemblies discussed, strength enhancement of the fragments is at a maximum, as in board No. 6. By way of comparison, conventional wood-wool/Portland cement composites widely used at the present time of even higher density have MOR values below 7 kg/cm², and lack fire-retardant qualities.

EXAMPLE VIII

Fire-retardant low-density structural board products were made from sugar cane residue, i.e. bagasse resulting from mechanical expression of cane juices by passing the stalks which had been stripped of leaves through crushing rollers, and rinsing. The material comprised the rind fiber structure, the pith, and all other plant components namely waxes and siliceous deposits normally present in surface zones of sugar cane.

The bagasse was hammer-milled to produce fragments of random size ranging from dust-like particles to slivers of lengths up to about 8 cm with thicknesses in the range of 1–4 mm. The dust and finest fragments were screened out by passing the fragments over 20 mesh screen and by air-current separation. The dry fragments had average specific gravity about 0.21 and had visibly open and non-smooth surfaces except at rind exterior faces. The calculated total internal space, based on density and solids other than lignocellulosic material, was about 83% of the fragment volume, and tests with aqueous ammonium phosphate solution of density 1.4 indicated that 65% of the fragment volume could be readily impregnated by this liquid.

The estimated enclosing surface area of the selected fragments excluding minute fissures formed by the fragmentation process was 19,000 cm² per 100 grams of dry fragments.

A test quantity of 200 grams of air-dry fragments was measured out. Because of the fineness of the fragments and their very low bulk density, very low density formed products would be feasible to produce even under considerable compaction of a composite of which a major volume proportion—e.g. above 85%—is constituted by ligneus matter. A formulation of reactant cement solids was accordingly selected to provide a vesicular binder mass having 30% or more of its volume as gas-filled minute vesicles, gaining in binder mass volume and enhancing junction edge volumes of binder through lateral flow-out of the more fluent gel material during compaction. The void volume objective of not over 10% cavities was considered to gain the highest structural strength of the composite, for randomly-laid fragments.

A cement solids mixture was prepared comprising 150 grams of a dead-burned magnesia and 450 grams of dolomite, each component being of grain size to pass 100 mesh and retained on 200 mesh, with 70% by weight passing 150 mesh. The quality of the magnesium oxide grain as judged from measured density of 3.36 was inferred to furnish about 11.5%, 17.3 gms reactable to form magnesium oxyphosphate; accordingly 132.7 gms would serve only as a dense inert filler solid. The dolomite reactivity as judged from the measured density of 2.62 and $CO_2$ combined was inferred to contribute 10.5 gms of MgO to the reaction, the remainder, 428 grams, being inert filler solids.

360 grams of commercial fertilizer grade ammonium polyphosphate aqueous solution, of specific gravity [1,4] *1.4* and analysis 10% nitrogen as $NH_3$ and 34% $P_2O_5$ as phosphate, was poured over the bagasse and the fragments were tumble-mixed for two minutes. The surfaces then appeared visibly moist, those fragment portions less than one mm thick appearing to be surface saturated. This amount supplies about 9.5 milligrams of solution per square centimeter of enveloping surface, equivalent to a film of thickness 68 microns, supplying 3.23 milligrams $P_2O_5$ per square centimeter.

The powdered cement solids were sifted onto the wetted bagasse while the fragments were tumble-mixed, the mixing being continued for 22 seconds from the time of first contact of the solids with the films. The mixture was immediately dumped into a flanged board mold measuring 15×30 cm. levelled, and compacted by a pressure plate closely fitting in the form at unit pressure of 7.5 kg/cm$^2$. A slight relaxation of pressure at constant thickness of 2.53 cm was observed in the first 10 minutes.

The pressure was released at 12 minutes time after casting, and the board was removed and air dried for five days. At the time of release the product temperature was 54° C., and issue of ammonia was noted. The cured board thickness was 2.52 cm.

The resulting board product had a cured volume of 1017 CC and weighed 998 grams, indicating a bulk density of 0.980. The product along its edges and on its larger surfaces exhibited open structure, and could be blown through. By noting the initial displacement on immersion in a column of water, the cavity volume was measured as 67 CC, representing 6.6% of bulk volume. The MOR and MOE values obtained in static bending were respectively 79.4 and 17,900 kg/cm$^2$. These strength values are exceptionally high, for a composite having randomly-associated fragments. It is inferred that the high values result from the high volume ratio of binder mass (about 255 CC) relative to fragment bulk volume (1000 CC) and average binder deposit of 75 microns, there being significant deposit thickening adjacent to fragment junctions.

A computation of the residual ammonium phosphate solution remaining as dried salt crystallized within pores and cell spaces of the bagasse indicates that an amount in excess of that meeting Class A requirements for interior finish wood materials by building codes was held in the fragments. Two tests were performed to rate the product.

In a first test, the board product was exposed to direct flame of 800° C. temperature over an area of 4.5 by 4.5 cm, for 15 minutes. At the end of that time only minor surface scorching was evident; there was no flaming, minor gas evolution, and no smoke, but within the first two minutes water vapour was observed to be given off. The flame side was red-hot, but the applied flame was not enlarged by any flame contribution from the heated surface. At the end of the test, the face opposite to the test face was only slightly warm, with a localized surface area at 40° C.

In a second test an intense heating flame with flame temperature of 1200° C.-1400° C. was directed against a face area measuring about 15 cm diameter, until the board was perforated. The impinged surface area became glowing hot in about 30 seconds and a gradual ablation of oxidizing ligneus material was noted in a crater area developing. At 3½ minutes, the opposite surface was glowing. The time to burn through the 2.52 cm-thick board was between 3½ and 5 minutes from the commencement of the test. This test which is intended to be destructive showed that the fire-retarding properties impeded significantly combustion in the presence of very hot oxidizing flame as compared with conventional composites made of ligneus plant fragments and a mineral binder.

EXAMPLE IX

In order to evaluate the effects on shear strength of the mineral bond mass deposited as a joining material between adjacent surfaces of wood fragments contributed by different reactive cement solids, and the effects of very small particle size and mode of application, a series of wood veneer laminates were made up wherein a minor portion of the cement solids was chosen from magnesium and calcium oxides and hydroxides and this portion was used as an initial application to the wood surface which had previously absorbed ammonium phosphate solution, followed by application of the major portion of cement solids comprising coarser grains of dead-burned magnesia and dolomite.

Twenty-one wood veneers measuring 15 by 30 cm were sawn from clear billets of the wood species:

black cottonwood (Populus trichocarpa)
Douglas-Fir (Coast type) (Pseudotsuga menziesii)
Sitka spruce (Picea sitchensis).

Each wood strip had smooth flat surfaces and thickness [2,8] *2.8* mm.

Mineral solids for use as the minor portion of reactive alkaline earth metal compounds were prepared as follows:

A quantity of calcium hydroxide was prepared by hydrating fresh-burned lime and dispersing the hydrate as a slurry with vigorous beating in warm water (55° C.). A suspension of the finer particles was reserved, containing about 80 grams solids per liter.

Fresh-burned lime (CaO) was prepared by calcining lump limestone having 97.8% by weight of $CaCO_3$, the remainder being chiefly silica and clay. The material was ball-milled to a fine dust, which was screened to remove all particles larger than about 15 microns. The dust was held in dried state at very low relative humidity.

A quantity of magnesium hydroxide was also prepared as a precipitate using epsom salts ($MgSO_4$) and sodium hydroxide, the solids being filtered, washed, and slurried in cold water to form a suspension containing about 100 grams solids per liter.

A quantity of dead-burned magnesia grain of high density (3.36) was ball-milled to very fine particles, and screened to remove particles larger than about 15 microns. The fine dust was [slurred] *slurried* in ether to form a suspension carrying about 45 grams per liter immediately prior to its use in the tests to be described next.

In all tests the 3-ply laminate product was air dried for 6 to 8 days before application of test loads. Where necessary the board was slit lengthwise to provide one specimen for evaluation of MOR and MOE in static bending, and a second specimen for measuring bond shear strength. The second specimen was trimmed to 5 cm width and a groove was recessed into each outer face to pierce two wood layers, the grooves being spaced in the length direction of the board to provide a shear zone of area 5 cm by 5 cm; the end portions of the specimen provided gripping areas for applying tension load. This test would reveal failure of the weaker "glue" line of the pair of gluelines placed in shear stress by the load. The test data is presented in Table VIII.

One board was prepared from each wood species for tests (1), (2) and (3) by first tempering the wood to a measured moisture content. A wetting film of ammonium polyphosphate solution of commercial fertilizer grade of analysis 10:34:00 of specific gravity 1.4 having 50% solids content was applied to both faces of the interior ply and to the inner faces of the two outer plies, estimated to provide about 70 milligrams of solution per $cm^2$ of surface. The plies were clamped together and dried for 8 days, when the moisture content was again measured. The outer faces were grooved to pierce two wood layers to define a 5-cm long shear area, and the edges of the laminate were trimmed to leave a width of 5 cm.

The tests indicate that the dried salt residue at the interface between plies had limited shear strength, the value for cottonwood being almost 0.6 $kg/cm^2$, hence negligible contribution to measured shear strengths in other boards of the series could be attributed to salt residue.

Tests (4), (5) and (6) were carried out by applying aqueous suspension of $Mg(OH)_2$ to the ply faces in amount to supply about 7 milligrams solids per $cm^2$ of surface. The plies were air dried for three days to remove most of the water, when the faces showed a thin white coating of mineral. Ammonium polyphosphate was applied as a wetting film at the rate of 70 milligrams per $cm^2$ and the plies were assembled under about 7 $kg/cm^2$ unit pressure and air-dried while clamped. The boards were grooved and trimmed as described earlier, and tested to failure in at least one glue line. The results show that the deposit is weak in shear, due to insufficient volume of binder mass and the inability of the reaction products-chiefly magnesium oxyphosphates-to coalesce as a continuous deposit.

Tests (7), (8) and (9) were carried out to establish both the shear strength of a mineral bond mass formed by reaction of −100 mesh cement solids comprised of dead-burned magnesia and dolomite with absorbed ammonium polyphosphate solution as well as bending strength data, where no minor portion of very fine cementing compound is applied. The laminate board products were made by applying 70 milligrams of solution per $cm^2$ of surface, then dusting onto the wet films cement solids comprising 20 mg. of dead-burned magnesia of density 3.36 and 60 mg. of raw dolomite of density 2.62, both solids being of grain sizes between 100 mesh and +250 mesh. The plies were clamped at 7 $kg/cm^2$ compaction pressure and held for 30 minutes, then released and the boards were air dried for 7 days.

A 3-ply board specimen was made with veneers sawn from each of the three wood species to carry out tests (10), (11) and (12) to investigate the combined effects of an initial minor surface deposit of magnesium hydroxide of sub-micron particle sizes, and a subsequent loading of a major portion of cement solids as in boards (7) to (9). Each contact surface of three plies was initially wetted with an application of ammonium polyphosphate solution to supply about 40 milligrams of solution per $cm^2$ of surface area, after which the plies were allowed to absorb the liquid but not to dry out on their surfaces. An aqueous slurry of magnesium hydroxide was distributed on the solution-treated faces to apply about 7 mg of $Mg(OH)_2$ per $cm^2$, and the surface was allowed to dry in air until barely moist. A further application of 30 milligrams per $cm^2$ of the phosphate solution was made, followed by application of 80 milligrams of the mixed cement solids used in boards (7) to (9). The boards were pressed and cured as described. The marked increase in shear strength over the control specimens of tests (7) to (9), and the degree to which failure of the wood surfaces had occurred rather than failure through the binder mass, is apparent. The highest wood failure, in cottonwood, and the lowest, in Douglas-fir, correlates with reported shear strengths for these woods parallel to the grain, which are respectively 71.8 $kg/cm^2$ and 80.3 $kg/cm^2$. Because of the strength enhancement of the surface zone of wood contiguous to the mineral binder deposit, as has been reported in the other examples, it is speculated that failure in a plane through the binder lying between the ply surfaces occurs because the shear strength of the mineral binder is slightly less than that of the strengthened wood zone. It should be noted that the comparable strength of laminates bonded by phenol-formaldehyde resin, using the same woods, did not exceed 7 $kg/cm^2$.

The large increase in shear strength for combined applications of $Mg(OH)_2$ and magnesia/dolomite cement solids of particle sizes as mentioned may be ascribed to the improvement in penetration by magnesium oxyphosphate compounds into the pores, lumens, and microscopic wood fissures opening to the fragment surface, so that a strongly-anchored crystalline oxyphosphate mass occupies microspaces of the surface zone, which zone extends at least one cell layer in depth and possibly extends to a depth of 80 to 100 microns from the outer surface.

When structural products are made from ligneus fragments bonded by cement solids reacted with ammonium polyphosphate solution as recited in these tests, and subjected to static bending, the beam strength will be improved in direct proportion to the capability of the junction bond masses to withstand horizontal shear stress. To evaluate all strength properties of products made with combined forms of cement solids, tests (13), (14) and (15) were made using very fine particles of MgO of high density.

The contact faces of three plies of each wood species were wetted by polyphosphate solution as in control tests (7) to (9), and when the film had become absorbed into the wood leaving a surface moist to the touch, the prepared MgO (in ether suspension) was applied to the moist surfaces to supply about 6 mg of MgO per $cm^2$, and the ether allowed to evaporate, after which the cement solids of the control tests were applied. The laminates were quickly assembled and held clamped for 30 minutes, after which the boards were air-dried for 7 days. After slitting lengthwise, one specimen was tested for binder shear strength and the other tested in static bending.

The very high shear strength observed data indicated benefit to be obtained by using an initial minor loading of very small particle sizes before applying the major portion of the cement solids, as compared with the control group of laminates. It is of interest that both the control laminates and the laminates of tests (13) to (15) showed MOR values for cottonwood and spruce exceeding those for whole wood, which for the three species are respectively 600 kg/cm², 824 kg/cm² and 718 kg/cm². The gain may be ascribed to the combined enhancement of strengths by penetration of oxyphosphate compounds into the ply surfaces, and the residual ammonium phosphates crystallizing within the interior portions of each ply. The cell character and sequestered materials in Douglas-fir may account for the inferior MOR and MOE measurements of laminates.

Test laminates (16), (17) and (18) followed the same procedures as recounted above for tests (13) to (15), except that the alkaline earth metal compound applied in minor amount was CaO, as a suspension in ether, to supply about 7 milligrams per cm² of veneer face area. The test data in TABLE VIII indicates that such compound improves the strength properties as compared with the control tests.

Further test laminates (19), (20) and (21) repeated the procedures of tests (13) to (15), except that an aqueous suspension of $Ca(OH)_2$ in amount to supply about 9 milligrams per cm² of veneer face was applied. The strength measurements indicate that such compound improves the loading properties of the mineral binder mass into the surface wood zones.

TABLE VIII

| COTTON-WOOD | DOUGLAS-FIR Test No. | SPRUCE | MOISTURE CONTENT % | SURFACE LOADING AMOUNT mg/cm² | SHEAR STRENGTH kg/cm² | WOOD FAILURE IN SHEAR AREA % | STATIC MODULUS OF RUPTURE Kg/cm² | BENDING MODULUS OF ELASTICITY Kg/cm² |
|---|---|---|---|---|---|---|---|---|
| 1 | | | 8.5 | *Amm. Phos. | [0,6]0.6 | nil | — | — |
| | 2 | | 8.0 | Amm. Phos. | [0,5]0.5 | nil | — | — |
| | | 3 | 8.0 | Amm. Phos. | [0,37 ]0.37 | nil | — | — |
| 4 | | | 10.2 | Amm. Phos. 6.86 mg $Mg(OH)_2$ | [0,6]0.6 | nil | — | — |
| | 5 | | 9.1 | Amm. Phos. 7.80 mg $Mg(OH)_2$ | [0,6]0.6 | nil | — | — |
| | | 6 | 10.0 | Amm. Phos. 7.2 mg $Mg(OH)_2$ | [0,55]0.55 | nil | — | — |
| 7 | | | 7.8 | Amm. Phos. 80 mg cement+ | 4.36 | 15 | 1030 | 12,600 |
| | 8 | | 6.5 | Amm. Phos. 80 mg cement | 4.60 | 5 | 670 | 9,700 |
| | | 9 | 7.2 | Amm. Phos. 80 mg cement | 6.21 | 5 | 150 | 11,900 |
| 10 | | | 10.2 | Amm. Phos. 6.86 mg $Mg(OH)_2$ 80 mg cement | 13.08 | 40 | 1150 | 13,200 |
| | 11 | | 9.8 | Amm. Phos. 7.80 mg $Mg(OH)_2$ 80 mg cement | 12.04 | 15 | 990 | 12,000 |
| | | 12 | 10.0 | Amm. Phos. 7.2 mg $Mg(OH)_2$ 80 mg cement | 11.28 | 25 | 860 | 11,600 |
| 13 | | | 10.2 | Amm. Phos. 6 mg MgO 80 mg cement | 12.4 | 50 | 1100 | 12,800 |
| | 14 | | 9.8 | Amm. Phos. 6 mg MgO 80 mg cement | 11.8 | 20 | 870 | 10,300 |
| | | 15 | 10.0 | Amm. Phos. 6 mg MgO 80 mg cement | 8.6 | 15 | 706 | 9,800 |
| 16 | | | 10.2 | Amm. Phos. 7 mg CaO 80 mg cement | 9.3 | 7 | 1050 | 12,700 |
| | 17 | | 9.8 | Amm. Phos. 7 mg CaO 80 mg cement | 8.7 | 6 | 715 | 9,900 |
| | | 18 | 10.0 | Amm. Phos. 7 mg CaO 80 mg cement | 8.8 | 17 | 890 | 12,100 |
| 19 | | | 10.2 | Amm. Phos. 9 mg $Ca(OH)_2$ 80 cement | 12.7 | 22 | 1080 | 13,100 |
| | 20 | | 9.8 | Amm. Phos. 9 mg $Ca(OH)_2$ 80 mg cement | 11.1 | 12 | 741 | 9,900 |
| | | 21 | 10.0 | Amm. Phos. 9 mg $Ca(OH)_2$ 80 mg cement | 10.6 | 17 | 802 | 12,800 |

*Deposn. of Amm. Phosphate solution supplying 23.8 mg $P_2O_5$ per cm², all resn.
+Cement solids 20 mg MgO and 60 mg $MgCO_3$ (new document) – 100 mesh no + 200 mesh.

EXAMPLE X

A number of woody plant materials of low density, such as the straws of cereal seed plants (wheat, oats, rye, barley, millet) and stalks of oil seed plants (rapeseed, flax, cottonseed) which have relatively low strengths and may include pith portions, all of very low bulk densities, may be used to form useful products which, though being generally strong enough to be handled and transported without support, are not sufficiently strong in compression or bending to be properly called "structural" products, due to the very low formed densities when assembled without compaction. The chief utility for panels formed from such materials at densities under about 0.35 is as insulative forms intended to occupy space between inner and outer structure walls of cold storage chambers or as wall, ceiling and roof insulation in houses.

To evaluate the properties of extremely low density panels which may be formed from optimum arrangements of straw, as low as about 0.10 bulk density, having fire-retardant properties, mature stalks of winter rye were harvested from the field just above ground so as to avoid bending or crushing the stems, and the heads were removed, leaving average stalk lengths of 91 cm, relatively free of leaf residues. It was found that a mold box measuring 2.5 m by 0.50 m by 15 cm depth would accept parallel-laid straw weighing 11000 grams in air-dry state, alternate layers being reversed so that butt-ends overlaid head-ends, and vice versa.

The 11000 grams of straw was laid out on a flat surface as a layer about 6 cm deep and 11270 grams of aqueous ammonium polyphosphate solution was sprayed, in stages, to apply a surface wetting film. The solution was commercial grade 10:34:00 material of 50% solids, solution analysis 34% $P_2O_5$ as mixed ortho, pyro, tri- and tetra-polyphosphates of ammonia, and included a minor portion of higher polyphosphates. The straw was rolled over three times while maintaining parallelism as spraying continued. The straw was again laid in shallow, parallel layer and 2400 grams of cement solids comprising 11270 grams of dead-burned, fine-grained magnesia of density 3.36 and 9500 grams of silica grain of density 2.63, all being of particle sizes passing 150 mesh screen and retained on +250 mesh, was sifted in stages onto the wetted straw. The straw was rolled up into a bundle after about one-third of the cement solids [have] *had* been applied, then laid out flat while a second one-third portion was sifted onto the stalks, again rolled into a bundle, spread, and the final portion of cement sifted. The application was completed within about 90 seconds from the initial contact of cement with the film. All parts of the straw appeared to have a continuous adhered coating of the powder.

The coated straw was lifted in portions which were spread uniformly in parallel arrangement, aligned with the 2.5 m direction of the mold, and further portions were arranged similarly as layers. A sheet of paper was laid upon the straw, and a polished, waxed mold plate was laid upon the paper, exerting only a few grams pressure per square centimeter of plan area, i.e., without compacting the straw.

The formed product was able to be removed within a half-hour and was cured by drying on a rack for 6 days at low relative humidity without application of heat at room temperature. The formed product [has] *had* a gross weight when cured of 38.15 kg representing a bulk density of 203.45 kilograms per cubic meter.

The straw could not be ignited by being exposed to direct flame of a gasoline blow-torch for 10 minutes, but charred in the heated zone.

Such panels are remarkably strong in bending despite being of very low density, due to the very long fragment length and lap joint area. The hollow tubular stems represent a favorable cross-section for resisting conduction of heat transversely of the assembly. The product stiffness was such that it could receive plaster or stucco, yet its stiffness was not too great to prevent the panel from being pressed as a friction-held insert between framing members.

Because this panel was far stronger than necessary, a further panel using one-half of the cement solids, and about 60% of the solution used in this example, was prepared as described below.

EXAMPLE XI

Rye straw as in the preceding example was weighed to provide a batch of 11,000 grams in air dry state. Following the wetting by 65,000 grams of ammonium phosphate solution, the wetted stems were clad with powdered cement solids as before, and the board was cast and cured, using a kraft paper liner in the mold bottom and a bleached light calendered card sheet of 0.4 mm thickness as face sheet, both sheets being left untreated otherwise than by capillary absorption of liquid from the straw in contact with the sheet surface.

The dried panel has a weight of just under 25 kilograms, representing a bulk density of 133.34 kg/cm$^3$. Even at this low density the binder formed on the free straw surfaces was of a thickness about 75 microns, and contiguous stems were well bonded by bridging deposits of mineral binder. The panel was amply strong for its purpose as insulation, and had good fire retardant properties.

The foregoing examples illustrate that many plant stalks and stems which are of low bulk density, notably reed grasses and cattails, may be assembled economically to form relatively rigid and strong composites having good insulative properties. Where such composites are integrally cast with a strong outer face sheet such as a wood veneer, a hardboard, or card or paper stock, the unit serves limited structural applications as well as being an insulating body.

Ammonium polyphosphate in solid form is also useful as impregnating salt and in one-step admixing of calcium or magnesium compounds with fragments, salt, and water. The utilisation of a solid such as TVA 11-55-0 or 12-54-0 powdered salt can be equally effective, but different procedures are indicated as compared with aqueous ammonium polyphosphate solutions, as shown in the following example.

EXAMPLE XII

Two batches of composites using Red Alder air-dried wood flake fragments of average thickness 1.3 mm and width and length dimensions 2 cm by 6 cm were made up, one by the single-step procedure of admixing salt, cement solids, and wood fragments then adding water, the other by first making an aqueous solution from the salt, and combining the solution with mixed flakes and cement solids.

In the first batch, 69 grams of 11-55-0 salt were added to 215 grams of air-dry wood fragments of 8.3% moisture content, together with 250 grams of particulate cement solids comprised of 25% dead-burned dense MgO of density 3.36 and 75% of dolomite both solids being of a range of grain sizes between 149 microns and 55 microns and having a packing ratio in tamped bulk form of 0.87. The mixture was stirred while 100 grams of water was sprayed onto the mix, and 30 seconds later the batch was turned out into a mold, raked and levelled, and compacted under 3 kg/cm$^2$ pressure between stainless steel mold plates. The product was allowed to set under pressure for 10 minutes, then released and air dried for 7 days before testing.

A second batch, using the same materials, was made by preparing a solution with the salt and the water, combining the cement solids and wood flakes, and adding the solution with mixing for 30 seconds before molding.

Both board products were adequately strong and had fire-retardant properties. The comparative strengths are shown in

TABLE IX

| Test | Mixing Mode | Board Thickness cm | Density kg/m$^3$ | MOR kg/cm$^2$ | MOE kg/cm$^2$ |
|---|---|---|---|---|---|
| 1 | 1 | 1.9 | 540 | 18.6 | 10,200 |
| 2 | 2 | 1.9 | 540 | 20.0 | 12,100 |
| 3* | 3 | 1.9 | 870 | 36.9 | 17,500 |

*EXAMPLE VI, TABLE VI, Alder Waters.

EXAMPLE XIII

Tests were made to investigate the influence of absorbed ammonium phosphate solution on the adhesion of the mineral binder deposit to lignocellulosic surfaces, by comparing composite products made with preimpregnation by solution and subsequent loading with cement solids, with products made by a process wherein the reacting components are simultaneously applied to the fragments. The tests also investigated the extent to which an effective amount of the solution can be withdrawn into the wood surfaces from a wetting layer in which MgO grains are reacting, so that a sufficient residue of ammonium phosphate salt will remain following the completion of curing of the product to contribute fire-retardant properties.

The relative openness of hardwoods to entry of the solution despite their higher bulk density and smaller lumen diameters results from their large-section pores which form conduits extending deeply into the wood. Softwood fragments offer tracheid lumen apertures which are substantially larger than in hardwoods, but penetration beyond the first cell layer by migrating solution is obstructed by the very narrow ports at cell junctions.

Seven sawn veneer samples were prepared from air-dry Yellow Birch, which is a hardwood species high in hemicellulose content, having high strength. Seven similar veneer specimens were prepared from Douglas Fir (Coast type). All veneers had flat, smooth faces, thickness 3 mm, and length and width dimensions of 28 cm and 5 cm.

One veneer of each species was tested in static bending to establish reference ultimate bending strength, MOR and MOE for the whole wood.

One Birch veneer specimen had both faces coated uniformly with ammonium polyphosphate solution of specific gravity [1,40] *1.40* and analysis 10-34-0, by a wetting layer weighing [26,4] *26.4* milligrams per square centimeter of surface area. Such layer if applied to a non-absorbent material would have a thickness of [0,188] *0.188* mm. It was quickly drawn into the veneer surface leaving a slightly moist film. Two other veneers had only one face wetted similarly. A measured weight of cement solids of grain size between −100 mesh and +200 mesh, comprised of 25% dead-burned MgO and 75% of dolomite, was sifted onto each moist surface, to supply a uniform loading of [56,3] *56.3* milligrams per square centimeter. The coated veneers were immediately clamped to form a three-layer laminate, with clamping pressure 2 kg/cm$^2$. The clamps were removed after 30 minutes and the board dried for 5 days before testing.

An identical procedure was followed to make a board with three sawn veneers of Douglas Fir.

By a modified procedure, a 3-layer board was made with the three remaining Birch veneer pieces, and a 3-layer board was also made with the remaining Douglas Fir pieces. The amounts of ammonium phosphate solution and of cement solids calculated for each face as explained above were first mixed briefly together in a round-bottom bowl until a viscous slurry was formed, and this material was quickly transferred to and spread evenly on the face while the veneer was seated in a jig having side flanges so that a straight-edge could be used to trowel and strike off an even layer about [0,3] *0.3* mm thick. The coated faces were immediately assembled, clamped under 4 kg/cm$^2$ compaction pressure, and cured as described hereinabove.

The boards were tested to their ultimate bending strength, obtaining MOR and MOE values. All boards failed in tension wood fracture of the bottom layer.

An end portion of the test board then was grooved by a pair of transverse grooves, one on each outer veneer and the grooves being spaced 5 cm apart along the board, severing two wood layers. The strength in shear was determined by applying a steadily increasing tension load to stress the bond layers in shear. The data is presented in Table X below.

TABLE X

COMPARISON OF PRODUCTS MADE BY ONE-STEP MIXING AND BY PRE-IMPREGNATION FOLLOWED BY CEMENT LOADING

| SPECIES | Process | Shear Strength kg/cm$^2$ | Wood Failure, % of face | Ultimate Static Bending kg/cm$^2$ | Mod. of Elast. kg/cm$^2$ | WHOLE WOOD MOR kg/cm$^2$ | WHOLE WOOD MOE kg/cm$^2$ |
|---|---|---|---|---|---|---|---|
| YELLOW BIRCH | one-step | 7.88 | 0 | 590 | 11,000 | 1188 | 148,200 |
| | pre-impreg. | 17.20 | 15 | 870 | 16,000 | 1188 | 148,200 |
| DOUGLAS FIR (Coast) | one-step | 4.20 | 0–5 | 330 | 7,900 | 844 | 135,700 |
| | pre-impreg | 14.64 | 20 | 710 | 10,900 | 844 | 135,700 |

The high shear strength and the high MOR of the Birch laminate product made with pre-impregnation of ammonium phosphate solution indicates the ability of the junction bond mass to resist longitudinal shear, which is directly related to the extent to which the mineral solid has become anchored physically into the hardwood surface.

The lower MOR value obtained with each wood species when the reactant materials are admixed before application to the wood points to the formation of the magnesium oxyphosphate product which is less intimately associated with the surface of the wood. The migration of the colloidal oxyphosphate under osmotic gradient toward the wood is apparently impeded so that crystal formation within the near-surface zones is less well developed by the surface application of mixed cement solids and ammonium polyphosphate solution which have already commenced to react with each other.

EXAMPLE XIV

To test the durability of composite material cast using wood fragments, ammonium polyphosphate solution and cement solids consisting of dead-burned dense magnesia and silica grain, board products were molded from a mix using flakes of dry poplar of average thickness 1.3 mm and widths and lengths 2 cm by 6 cm. The magnesia was of grain sizes ranging between 105 microns and 53 microns and of density 3.36; the silica was screened to the same sizes and had specific gravity 2.62. The flakes were wetted with ammonium polyphosphate solution in the proportion 112.5 grams to 215 grams of wood flakes to 250 grams of cement solids, of which 125 grams comprised magnesia grains. The solids were applied to the wetted fragments with agitation by tumble-mixing until all free powder was adhered to the flakes.

The mix was molded at 4 kg/cm$^2$ pressure between stainless steel polished plates. The plates were removed and the board taken out at 10 minutes time, and cured at room temperature for 6 days when the board was fully air-dried.

The board was sawn into two parts and one was tested in static bending, having a MOR of 25.7 kg/cm$^2$ and MOE of 12,340 kg/cm$^2$, at density 0.551.

The other part was alternately immersed in tap water for 15 minutes, drained and re-dried in air for 3 days, then immersed in sea water for 15 minutes, drained and dried for 3 days, and the cycle repeated for 21 days, ending with prolonged immersion and rinsing in tap water before final air-drying. The weight in air-dried state as measured before the first immersion was compared with its weight at the end of the cycle.

A slight reduction (7%) in MOR was measured, and very low weight loss (3%) recorded for the weathered portion.

The relatively high bonding rate will make the present invention especially useful for continuous casting and molding of high strength light weight hollow circular or rectangular tubular bodies especially such as used for drainage tiles, culverts and longer pipe sections. Usefulness of this invention for such application becomes especially evident as porosity and permeability to fluids is made technically possible by selecting manufacturing conditions under which porous light weight tubes such as required for low pressure underground irrigation can be had. On the other hand, by selecting conditions under which migration of colloids to surface is promoted closed surface drainage tiles and culverts can be fabricated. Similarly, for poles where high bending strength and light weight might be important assets the continuous molding process may include low rpm spinning of the mold during or after casting to cause simultaneous densification of the wet mass and colloid migration to the surfaces on account of the centrifugal forces created by the spinning motion. By variation of this technology a large variety of useful molded products can be formed.

EXAMPLE XV

To 400 g of air-dry spruce wood fragments, passing 5 mesh and retained on 20 mesh screens, 700 g of green wet process ammonium polyphosphate solution of 1.4 specific gravity having 50% salt solids and the solution analysing 10:34:00 nitrogen (as $NH_4$) and $P_2O_5$ was added with mixing. The phosphate-wet fragments were allowed to stand for 5 min whereupon they were dusted with 1200 g of cement solids comprised 2.25 parts of ground dolomite in amount of 900 g and 0.75 parts of dead burned MgO in amount of 300 g both in powder form passing 100 mesh and retained on 250 mesh screens. The resulting mass was briefly mixed to obtain uniform coating of the wet fragments before it was filled into a 45 cm long plexyglass tube mold having a 15 cm inside diameter and fitted with a centre core piece of 11 cm. The mix was allowed to cure for 20 min inside the tube whereupon it was carefully removed and air-dried for 7 days. The hollow tube had a density of 0.53 and weighed 1967 g. It could carry a uniformly distributed load of 2 kg/cm length without breaking and was relatively pervious to water over its full length.

EXAMPLE XVI

The same mix as described in EXAMPLE XV when filled into the same mold and the mold spinned at 3 rps for 5 min was cured into a hollow tube having a wall thickness of 1.2 cm and a density of 0.85. The product was strong and contrary to the previous product it was impervious to water.

EXAMPLE XVII

In a subsequent trial larger tubular sections were cast with ease using air-dry spruce wood slivers of 0.5 to 3 cm length and maximum diameter of 3 mm. The proportions of cement solids and ammonium polyphosphate were similar to those described for the foregoing examples. The plexyglass tube measured 30 cm inside diameter and was 50 cm long with a 15 cm solid core positioned exactly in the center. The assembly was filled with the freshly mixed mass and rotated simultaneously at a speed of 5 rps. Following removal from the mold and airdrying for 7 days the section was found to have a density of 1.25 and a wall thickness of 9.7 cm. The calculated MOR for the section was 580 kg/cm$^2$ and should have had a 372 kg allowable bending load capacity on a 10 m section when held at one end. Obviously stronger sections could be fabricated with judicious use of stronger fragments such as oriented flakes that could be "wrapped around" the outside circumference resisting the high stresses and by incorporating high strength fibers and steel reinforcement in the high-tension areas.

The embodiments of the invention in which an exclusive property or privilege is claimed are defined as follows:

1. [The] *A* method of making a [molded] composite product [including] *by joining a plurality of individual members, each of which is made of* a [ligneus] *ligneous* plant material with surfaces having internal pore spaces, [which is bonded with a mineral binder which comprises] *the method comprising the steps of*:

(a) [providing] *applying* an aqueous solution of an ammonium phosphate or ammonium polyphosphate on the plant material [so as] *of the individual members in a manner to allow the aqueous solution* to be absorbed within the pore spaces and to wet the surfaces. [along with] *and* a particulate alkaline earth metal oxide, hydroxide, or carbonate on the wetted surfaces which reacts with the ammonium phosphate or ammonium polyphosphate *in the pore spaces and on the wetted surfaces* to form an alkaline earth metal oxyphosphate *wet paste* as [the] *a* binder within the pores and as a [wet paste] coating on the [surfaces] *surface*; and (b) [molding] *curing* the wet paste [coated material] until the oxyphosphate is solidified within the pores and on the surfaces *to bond with the ligneous plant material and to join the individual members* to form the composite product.

2. The method of claim 1 wherein the [plant material is] *individual members are* in the form of multiple wood sheets bonded together by the mineral binder at a pressure during [molding of 2] *curing of up* to 14 kg/cm$^2$.

3. The method of making a [molded] composite article comprised of a mass of [ligneus] *ligneous* plant fragments with surfaces having internal pore spaces and a mineral binder bonding the fragments together at the surfaces and in the pores, which comprises:

(a) applying to the surfaces and pore spaces of a mass of [ligneus] *ligneous* fragments an aqueous solution of ammonium phosphate or polyphosphate *in a manner to allow the aqueous solution to be absorbed within the pore spaces and to wet the surfaces, and* in an amount of from about 0.85 to about 1.8 parts by weight per part of said fragments calculated on their dried weight as a [setting] wetting film supplying from about 0.22 to about 0.70 parts of $P_2O_5$, and a loading of particulate mineral solids in *an* amount of from about [0.65 to 1.50] *0.93 to 4.0* parts comprised of dead-burned magnesium oxide admixed with finely particulate mineral filler, said filler being present in an amount between a trace and three times the weight of the magnesium oxide, said mineral solids comprising grains of size ranging from 149 micron to 53 micron, so that the ammonium polyphosphate and magnesium oxide reacts *within the pore spaces and on the wetted surfaces* to form the mineral binder within the pore spaces and on the surfaces of the fragments; *and*

(b) [molding] *curing* the mass of fragments and the particulate mineral solids [with compaction] to form said composite article while said binder is at a temperature so as to be substantially as a wet paste

[(c) holding the molded mass until the binder has solidified to form the composite article.] , *the oxyphosphate material solidifying within the pores and on the surfaces to bond with the ligneous plant fragments to form the composite article.*

4. The method of claim 3 wherein the composite article is [released from holding within] *cured for about* 20 to 30 minutes and subjected to drying at a temperature between about 10° C. and 50° C.

5. The method of claim 3, *4 or 46* wherein said fragments have a moisture content between about 0.5% and 100% by weight prior to application of said mineral binder.

6. The method of claim 3, *4 or 46* wherein the fragments have [means] *mean* thickness dimensions of from about 0.3 mm to about 8 mm and have combined length and breadth dimensions in the range from about 7 combined millimeters to about 4,000 combined millimeters.

7. The method of claim 3, 4 or [5] *46* wherein the [molded] *cured* mass is held under compaction produced only by gravity-induced pressures of the fragments, solution and solids against each other.

8. The method of claim 3, 4 or [5] *46* wherein the [molded] *cured* mass is held under compaction with unit pressures in the range from about 0.3 to 14 kg/cm$^2$.

9. The method of claim 3, 4 or [5] *46* wherein the aqueous solution and mineral solids are applied by simultaneous spraying and dusting operations while the mass of fragments is undergoing mixing, and is mixed further for from 4 seconds to about 4 minutes before [molding.] *curing.*

10. The method of claim 3, 4 or [5] *46* wherein the aqueous solution and mineral solids are applied separately and either component is applied first.

11. The method of claim 3, 4 or [5] *46* wherein the aqueous solution is applied first to the fragments and the wetted mass of fragments is held for a time sufficient to allow said solution to become almost wholly absorbed into the pores spaces in the fragment surfaces while retaining a wetting film on the surfaces and the said mineral solids are applied as a coating on said wetting film and fragments.

12. The method of claim 3, 4 or [5] *46* wherein said aqueous solution is applied as an initial application of a fractional portion less than one-half of said amount of solution to said fragments and the fragments are stored under non-drying conditions, and the remainder of said amount of solution is applied to the fragments subsequently and the mass held for a time sufficient to allow the added solution to become substantially absorbed into fragment surfaces while retaining a surface wetting film, and the said mineral solids are thereafter applied as a coating on said wetting film and fragments.

13. The method of claim 3, 4 or [5] *46* wherein the aqueous solution and mineral solids are applied to the fragments without significant mechanical mixing other than the mixing effected by [molding] and compacting said *curing* mass.

14. The method of claim 3, 4 or [5] *46* wherein said fragments are adhered to at least one sheet of wood having opposed surfaces of substantial lateral extent, and said aqueous solution and said solids are distributed by mechanical spreading action over at least one surface of each sheet, and said sheet and fragments are assembled in superimposed contacting relation under a pressure of 2 to 14 kg/cm$^2$ with solution and solids to form a laminated board product.

15. The method of claim 3, 4 or [5] *46* wherein the ammonium polyphosphate solution comprises mixed ammonium phosphates including about 35% to 40% of ammonium orthophosphate, about 45% to 50% of ammonium pyrophosphate, about 9% to 11% of ammonium tripolyphosphate, and about 2% to 5% higher ammonium polyphosphates, the solution having an ammonium content equivalent to a nitrogen analysis of 10% to 11% and having a phosphate ion content equivalent to a $P_2O_5$ analysis of about 34% to 37% by weight.

16. The method of claim 3, 4 or [5] *46* wherein the particulate mineral filler is selected from the group consisting of silica, alumina, zirconia, magnesium silicate, magnesium phosphate, aluminum phosphate, calcium silicate, calcium phosphate, pulverised firebrick, burnt shale, dolomite and limestone.

17. The method of claim 3, 4 or [5] *46* wherein the aqueous solution is applied first for a time sufficient to allow said solution to become almost wholly absorbed into fragment surfaces while retaining a surface wetting film, and particulate solids comprising dead-burned magnesium oxide and ground dolomite are loaded on said film as an adherent coating, the dolomite comprising 2 to 3 parts by weight per part of magnesium oxide.

18. The method of claim 3, 4 or [5] *46* wherein said ligneus plant fragments are shaped from the woody parts of softwood trees, hardwood trees, cereal plant stalks, bamboo, sugar cane and fiber plant stalks.

19. The process of forming a structural product comprised of a mass of ligneus plant fragments having surfaces with internal pore spaces bonded together by a mineral binder comprising the metal oxyphosphate reaction product of a base metal compound selected from the class consisting of magnesium and calcium oxides, hydroxides and carbonates with an aqueous solution of an ammonium polyphosphate or ammonium phosphate compound, the fragments having thickness dimensions between surfaces of between about 0.3 mm and 8 mm, comprising the steps:

(a) applying to the surfaces and pore spaces of a mass of ligneus plant fragments an aqueous solution of the ammonium polyphosphate compound to form a wetting coating providing from about 12 to about 20 mg of $P_2O_5$ per square centimeter of fragment surface per millimeter of half-thickness;

(b) holding said wetted, coated mass for a time sufficient to allow said solution to become absorbed almost wholly into the internal pore spaces in the fragments while retaining a moistened surface;

(c) depositing finely particulate powder comprised of said base metal compound and a particulate solid mineral filler as a coating on said moistened surfaces in an amount from about 20 to about 90 milligrams per square centimeter of fragment surface per millimeter of half-thickness, said base metal compound comprising about 20 to about 50 milligrams of said amount and said filler being in the range from a trace to about three times the weight of the base metal compound to form the metal oxyphosphate as a wet paste within the pore spaces and on the fragments;

(d) molding the coated fragments into a structural shape while the metal oxyphosphate is a wet paste until the mineral binder has solidified;

(e) and drying the product at a temperature between 10° C. and 50° C.

20. The process according to claim 19 wherein said solution comprises mixed ammonium phosphates produced by reacting concentrated ammonium hydroxide solution with polyphosphoric acid having a $P_2O_5$ content of about 83 to produce an aqueous solution providing about 28% to 37% of $P_2O_5$ by weight.

21. The process according to claim 19 or 20 wherein said mineral filler is inert with respect to said solution.

22. The process according to claim 20 wherein said mineral solid filler is a magnesium-containing compound which is weakly reactive with said solution and is selected from the group consisting of dolomites and raw magnesium carbonate and the base metal compound is dead-burned magnesia, said filler and said magnesia being of grain sizes ranging from about 50 microns to about 250 microns.

23. The process according to claim 20 wherein said mineral solid filler is selected from the group consisting of dolomite, dolomitic limestone and limestone, and the base metal compound is oxide of calcium, said filler and base metal compound being of grain sizes ranging from about 50 microns to about 250 microns.

24. The process according to claim 22 or 23 wherein said powder is applied first as finely divided particles of magnesium hydroxide as the base metal compound in amount of from about 1.5 to about 3.5 milligrams per square centimeter of fragment surface, followed by additional base metal compound mixed with said filler.

25. The process according to claim 19 wherein said ligneus plant fragments have a length dimension generally aligned with a fiber length direction within the fragments and a thickness dimension in the range from about 300 microns to about 8,000 microns and are selected from the group of fragment forms including shavings, flakes, veneers, chips and strands.

26. The process according to claim 25 wherein said ligneus fragments are formed from the woody parts of softwood trees, hardwood trees, cereal plant stalks, bamboo, sugar cane and fiber plant stalks.

27. The process according to claim 26 wherein said fragments are formed by slicing wood billets to form sheets and then slicing the sheets to form strands of wood having a width between about 1.5 millimeters and about 5 millimeters.

28. The process according to claim 26 wherein said fragments comprise sugar cane having the pith removed and the rind cut into inter-node lengths, the lengths divided into segments, and the segments flattened to form loosely-connected strands of width from about 3 millimeters to about 10 millimeters.

29. The process according to claim 28 wherein said cane lengths are further prepared by scraping to remove waxy and siliceous outer layers.

30. The process according to claim 25 wherein the fragments comprise straw of cereal grain plants, and the straw has been roller-flattened to crush nodes and to fissure the straw.

31. The process according to claim 25 wherein the fragments comprise bagasse.

32. The process according to claim 27, 28 or 30 wherein the fragments are assembled as a board product having the fragments predominantly oriented with their thickness dimension parallel to the thickness dimension of the board.

33. The process according to claim 27, 28 or 30 wherein the fragments are assembled by tumble-mixing of the wetted clad mass of fragments and the mix is transferred while the binder remains as a wet paste into a mold as one or more layers to form a board product.

34. The process according to claim 27, 28 or 30 wherein the powder is applied by sifting through a screen to coat the fragments while the wetted mass is undergoing tumble-mixing and the mixing is continued for a period of about 4 seconds to about 4 minutes, and then the coated fragments are molded into the structural shape.

35. The process according to claim 27, 28 or 30 wherein said deposit of particulate powder is applied as a first deposit of magnesium hydroxide as the base metal compound of particle size ranging from sub-micronic to a few microns in an amount of from 1.5 to about 3.5 milligrams per square centimeter of fragment surface area, and then additional base metal compound and filler is thereafter applied.

36. The process according to claim 28 or 29 wherein the strands are assembled in layers with strand lengths parallel in any layer and angularly related to strand lengths of an adjacent layer to form a board product and said product is held under a compaction pressure such that said board when dried has a specific gravity from about 0.38 to about 0.9.

37. The process according to claim 28 or 29 wherein the strands are assembled in parallel relation to form a board product, and said product is held under a compaction pressure such that said board when dried has a specific gravity from about 0.38 to about 0.9.

38. The process according to claim 27, 28 or 30 wherein said fragments with the solution, base metal compound and filler are tumble-mixed for a period of from about 4 seconds to 2 minutes and the mixture is spread in a mold to orient the fragments as one or more layers to form a board product, and are held under a compaction pressure such that said board when dried has a specific gravity from about 0.38 to about 0.95.

39. The process according to claim 25 wherein the aqueous solution and said powder are continuously deposited on the fragments which are continuously assembled into the structural product.

40. The process according to claim 20 wherein said curing step is carried out with circulation of air of low relative humidity about the product surfaces to entrain liberated ammonia gas as a by-product from the metal oxyphosphate reaction and said ammonia is recovered from exhaust air to provide a portion of the ammonium hydroxide reacted with polyphosphoric acid to form the ammonia polyphosphate.

41. The process of claim 3 or claim 19 wherein said solution of ammonium phosphate or ammonium polyphosphate is selected from the group consisting of monoammonium orthophosphate and ammonium polyphosphate in amount to supply said amount of $P_2O_5$ and the mixture is wetted by applying water in amount about equal to the weight of the salt.

42. The process of claim 25 wherein said ligneus fragments may include bark portions of tree plants from which said fragments are removed.

43. [The] *A* method of making a cast composite structural product comprised of [ligneus] *ligneous* plant fragments bonded together by an adhered mineral binder, comprising:

(a) applying to the [ligneus] *ligneous* fragments having mean thickness dimensions between surfaces ranging from about one mm to about 8 mm as binder-forming components finely-particulate dead-burned magnesia and an aqueous solution of ammonium polyphosphate providing phosphate ions equivalent to about 32% to about 37% of solution weight as $P_2O_5$, said components being in the weight proportion of one part magnesia to [0.9] *0.5* to 1.2 parts of solution, and mineral solid particulate filler in the proportion of a trace to about 3 parts per weight of magnesia, *in a manner to allow the aqueous solution to be absorbed within pore spaces and to wet surfaces of the ligneous fragments* so that said solution coats and wets the magnesia, filler and fragments to initiate chemical reaction producing a wet paste of a magnesium oxyphosphate binder settable as a solid adherent binder anchored in the *pores and on the surfaces of the* fragments and ammonia gas, said binder forming a layer of mean weight ranging from about 15 milligrams to about 120 milligrams per square centimeter of fragment surface area;

(b) molding the coated fragments while the binder remains as the wet paste to form a shaped product;

(c) holding the molded fragments until the binder has solidified from the wet paste; and (d) drying the product.

44. The method of making a cast composite structural product as set forth in claim 43 wherein said drying step is carried out by circulating air at low relative humidity about the product at a temperature between about 20° C. and about 50° C., and recovering the ammonia gas which is released as a by-product of the reaction of the ammonium phosphate and magnesia from the air.

*45. The method of claim 1 wherein said step of curing said material includes the step of molding said wet paste coated material until said oxyphosphate is solidified.*

*46. The method of claim 3 wherein said curing step includes the step of molding said mass of fragments with compaction; said method further comprising the step of holding the molded mass until said binder has solidified to form said composite article.*

*47. The method as set forth in claim 1 wherein the individual members are in the form of fragmented pieces.*

*48. The method as set forth in claim 1 wherein the wet paste is characterized by the absence of added water.*

*49. A method of making a composite product by joining a plurality of individual members, each of which is made of a ligneous plant material with surfaces having internal pore spaces, the method comprising the steps of:*

*a. applying an aqueous solution consisting essentially of an ammonium phosphate or ammonium polyphosphate on the plant material of the individual members in a manner to allow the aqueous solution to be absorbed within the pore spaces and to wet the surfaces of the ligneous plant material, along with a particulate alkaline earth metal oxide, hydroxide, or carbonate on the wetted surfaces which reacts with the ammonium phosphate or ammonium polyphosphate in the pore spaces and on the wetted surfaces to form an alkaline earth metal oxyphosphate wet paste as a binder within the pores and as a coating on the surfaces; and*

*b. curing the wet paste until the oxyphosphate is solidified within the pores and on the surfaces to form a bond with the ligneous plant material and to join the individual members to form the composite product.*

*50. The method as set forth in claim 1 additionally comprising the step of air drying the individual members prior to step a to reduce an amount of moisture present in said ligneous plant material.*

*51. The method of claim 1 wherein the aqueous solution comprises:*

*a. from 0.15 to 0.40 parts by weight of $P_2O_5$ as phosphate ion per part by weight of ligneous plant material; and*

*b. from 0.93 to 4.0 parts by weight of alkaline earth metal oxide, hydroxide, or carbonate per part by weight of ligneous plant material.*

*52. The method of claim 3 wherein:*

*a. the aqueous solution of ammonium phosphate or polyphosphate is applied in an amount from about 0.85 to about 1.8 parts by weight per part ligneous fragments; and*

*b. the loading of particulate mineral solids is in an amount from about 0.93 to 1.50 parts comprised of dead-burned magnesium oxide admixed with finely particulate mineral filler.*

*53. The method of claim 43 wherein the weight proportion of magnesia to solution is one part magnesia to 0.9 to 1.2 parts of solution.*

54. The method of making a composite article comprised of a mass of ligneous plant fragments with surfaces having internal pore spaces and a mineral binder bonding the fragments together at the surfaces and in the pores, which comprises:

a. applying to the surfaces and pore spaces of a mass of ligneous fragments an aqueous solution of ammonium phosphate or polyphosphate in amount of from about 0.85 to about 1.8 parts by weight per part of said fragments calculated on their dried weight as a wetting film supplying from about 0.22 to about 0.70 parts of $P_2O_5$, and a loading of particulate mineral solids in amount of from about 0.65 to 1.50 parts comprised of dead-burned magnesium oxide admixed with finely particulate mineral filler, said filler being present in amounts between a trace and three times the weight of the magnesium oxide, said mineral solids comprising grains of size ranging from 149 micron to 53 micron, so that the ammonium polyphosphate and magnesium oxide reacts to form the mineral binder within the pore spaces and on the surfaces of the fragments, wherein the aqueous solution is applied first to the fragments and the wetted mass of fragments is held for a time sufficient to allow said solution to become almost wholly absorbed into the pore spaces in the fragment surfaces while retaining a wetting film on the surfaces and the said mineral solids are applied as a coating on said wetting film and fragments; and b. curing the mass of fragments and the particulate mineral solids to form said composite article while said binder is at a temperature so as to be substantially as a wet paste.

55. The method of making a composite article comprised of a mass of ligneous plant fragments with surfaces having internal pore spaces and a mineral binder bonding the fragments together at the surfaces and in the pores, which comprises:

a. applying to the surfaces and pore spaces of a mass of ligneous fragments an aqueous solution of ammonium phosphate or polyphosphate in amount of from about 0.85 to about 1.8 parts by weight per part of said fragments calculated on their dried weight as a wetting film supplying from about 0.22 to about 0.70 parts of $P_2O_5$, and a loading of particulate mineral solids in amount of from about 0.65 to 1.50 parts comprised of dead-burned magnesium oxide admixed with finely particulate mineral filler, said filler being present in amount between a trace and three times the weight of the magnesium oxide, said mineral solids comprising grains of size ranging from 149 micron to 53 micron, so that the ammonium phosphate and magnesium oxide reacts to form the mineral binder within the pore spaces and on the surfaces of the fragments, wherein the aqueous solution is applied first to the fragments and the wetted mass of fragments is held for a time sufficient to allow said solution to become almost wholly absorbed into the pore spaces in the fragment surfaces while retaining a wetting film on the surfaces and the said mineral solids are applied as a coating on said wetting film and fragments; and b. curing the mass of fragments and the particulate mineral solids to form said composite article while said binder is at a temperature so as to be substantially as a wet paste, wherein the composite article is cured for about twenty to thirty minutes and is subjected to drying at a temperature between about 10° C. and 50° C.

56. The method of making a composite article comprised of a mass of ligneous plant fragments with surfaces having internal pore spaces and a mineral binder bonding the fragments together at the surfaces and in the pores, which comprises:

a. applying to the surfaces and pore spaces of a mass of ligneous fragments an aqueous solution of ammonium phosphate or polyphosphate in amount of from about 0.85 to about 1.8 parts by weight per part of said fragments calculated on their dried weight as a wetting film supplying from about 0.22 to about 0.70 parts of $P_2O_5$, and a loading of particulate mineral solids in amount of from about 0.65 to 1.50 parts comprised of dead-burned magnesium oxide admixed with finely particulate mineral filler, said filler being present in amount between a trace and three times the weight of the magnesium oxide, said mineral solids comprising grains of size ranging from 149 micron to 53 micron, so that the ammonium polyphosphate and magnesium oxide reacts to form the mineral binder within the pore spaces and on the surfaces of the fragments, wherein the aqueous solution is applied first to the fragments and the wetted mass of fragments is held for a time sufficient to allow said solution to become almost wholly absorbed into the pore spaces in the fragment surfaces while retaining a wetting film on the surfaces and the said mineral solids are applied as a coating on said wetting film and fragments, wherein the fragments have a moisture content between about 0.5% and 100% by weight prior to application of said mineral binder; and b. curing the mass of fragments and the particulate mineral solids to form said composite article while said binder is at a temperature so as to be substantially as a wet paste, wherein the composite article is cured for about twenty to thirty minutes and is subjected to drying at a temperature between about 10° C. and 50° C.

57. The method of making a composite article comprised of a mass of ligneous plant fragments with surfaces having internal pore spaces and a mineral binder bonding the fragments together at the surfaces and in the pores, which comprises:

a. applying to the surfaces and pore spaces of a mass of ligneous fragments an aqueous solution of ammonium phosphate or polyphosphate in an amount of from about 0.85 to about 1.8 parts by weight per part of said fragments calculated on their dried weight as a wetting film supplying from about 0.22 to about 0.70 parts of $P_2O_5$, and a loading of particulate mineral solids in amount of from about 0.65 to 1.50 parts comprised of dead-burned magnesium oxide admixed with finely particulate mineral filler, said filler being present in an amount between a trace and three times the weight of the magnesium oxide, said mineral solids comprising grains of size ranging from 149 micron to 53 micron, so that the ammonium polyphosphate and magnesium oxide reacts to form the mineral binder within the pore spaces and on the surfaces of the fragments, and wherein the aqueous solution is applied first for a time sufficient to allow said solution to become almost wholly absorbed into fragment surfaces while retaining a surface wetting film, and particulate solids comprising dead-burned magnesium oxide and ground dolomite are loaded on said film as an adherent coating, the dolomite comprising two to three parts by weight per part of magnesium oxide; and b. curing the mass of fragment and the particulate mineral solids to form said composite article while said binder is at a temperature so as to be substantially as a wet paste.

58. The method of making a composite article comprised of a mass of ligneous plant fragments with surfaces having internal pore spaces and a mineral binder bonding the fragments together at the surfaces and in the pores, which comprises:

a. applying to the surfaces and pore spaces of a mass of ligneous fragments an aqueous solution of ammonium phosphate or polyphosphate in amount of from about 0.85 to about 1.8 parts by weight per part of said fragments calculated on their dried weight as a wetting film supplying from about 0.22 to about 0.70 parts of $P_2O_5$, and a loading of particulate mineral solids in amount of from about 0.65 to 1.50 parts comprised of dead-burned magnesium oxide admixed with finely particulate mineral filler, said filler being present in amount between a trace and three times the weight of the magnesium oxide, said mineral solids comprising grains of size ranging from 149 micron to 53 micron, so that the ammonium polyphosphate and magnesium oxide reacts to form the mineral binder within the pore spaces and on the surfaces of the fragments, wherein the aqueous solution is applied first for a time sufficient to allow said solution to become almost wholly absorbed into fragment surfaces while retaining a surface wetting film, and particulate solids comprising dead-burned magnesium oxide and ground dolomite are loaded on said film as an adherent coating, the dolomite comprising two to three parts by weight per part of magnesium oxide;

b. curing the mass of fragments and the particulate mineral solids to form said composite article while said binder is at a temperature so as to be substantially as a wet paste, wherein the composite article is cured for about twenty to thirty minutes and is subjected to drying at a temperature between about 10° C. and 50° C., and wherein the aqueous solution is applied first for a time sufficient to allow said solution to become almost wholly absorbed into fragment surfaces while retaining a surface wetting film, and particulate solids comprising dead-burned magnesium oxide and ground dolomite are loaded on said film as an adherent coating, the dolomite comprising two to three parts by weight per part of magnesium oxide and wherein said fragments have a moisture content between about 0.5% and 100% by weight prior to application of said mineral binder.

59. The method of making a composite article comprised of a mass of ligneous plant fragments with surfaces having internal pore spaces and a mineral binder bonding the fragments together at the surfaces and in the pores, which comprises:

a. applying to the surfaces and pore spaces of a mass of ligneous fragments an aqueous solution of ammonium phosphate or polyphosphate in an amount of from about 0.85 to about 1.8 parts by weight per part of said fragments calculated on their dried weight as a wetting film supplying from about 0.22 to about 0.70 parts of $P_2O_5$, and a loading of particulate mineral solids in an amount of from about 0.65 to 1.50 parts comprised of dead-burned magnesium oxide admixed with finely particulate mineral filler, said filler being present in an amount between a trace and three times the weight of the magnesium oxide, said mineral solids comprising grains of size ranging from 149 micron to 53 micron, so that the ammonium polyphosphate and magnesium oxide reacts to form the mineral binder within the pore spaces and on the surfaces of the fragments, and wherein the aqueous solution is applied first for a time sufficient to allow said solution to become almost wholly absorbed into fragment surfaces while retaining a surface wetting film, and particulate solids comprising dead-burned magnesium oxide and ground dolomite are loaded on said film as an adherent coating, the dolomite comprising two to three parts by weight per part of magnesium oxide and wherein said fragments have a moisture content between about 0.5% and 100% by weight prior to application of said mineral binder; and b. curing the mass of fragments and the particulate mineral solids to form said composite article while said binder is at a temperature so as to be substantially as a wet paste, wherein the composite article is cured for about twenty to thirty minutes and is subjected to drying at a temperature between about 10° C. and 50° C.

60. The method of making a cast composite structural product comprised of ligneous plant fragments bonded together by adhered mineral binder, comprising:

a. applying to the ligneous fragments having mean thickness dimensions between surfaces ranging from about one mm to about eight mm as binder-forming components finely-particulate dead-burned magnesia and an aqueous solution of ammonium polyphosphate providing phosphate ions equivalent to about 32% to about 37% of solution weight as $P_2O_5$, said components being in the weight proportion of one part magnesia to 0.9 to 1.2 parts of solution, and mineral solid particulate filler in the proportion of a trace to about 3 parts per part of magnesia, so that said solution coats and wets the magnesia, filler and fragments to initiate chemical reaction producing a paste of a magnesium oxyphosphate binder setable as a solid adherent binder anchored in the fragments and ammonia gas, said binder forming a layer of mean weight ranging from about 15 milligrams to about 120 milligrams per square centimeter of fragment surface area;

b. molding the coated fragments while the binder remains as the wet paste to form a shaped product;

c. holding the molded fragments until the binder has solidified from the wet paste; and d. drying the product by circulating air at low relative humidity about the product at a temperature between about 10° C. and about 50° C., and recovering the ammonia gas which is released as a by-product of the reaction of the ammonium phosphate and magnesia from the air.

61. The method of claim 1 wherein the particulate alkaline earth metal oxide, hydroxide or carbonate is applied to the plant material separately from the application of the aqueous solution of ammonium phosphate or ammonium polyphosphate.

* * * * *